US008326754B2

(12) United States Patent
Bandych et al.

(10) Patent No.: US 8,326,754 B2
(45) Date of Patent: Dec. 4, 2012

(54) METHOD AND SYSTEM FOR PROCESSING TRANSACTIONS

(75) Inventors: David W. Bandych, Penfield, NY (US); John T. Marron, Rochester, NY (US); Mark Hoffmeyer, Blaine, MN (US); Michael J. Barnes, Excelsior, MN (US); Tim Dawson, Inner Grove Heights, MN (US); Paul Hanson, Eden Prairie, MN (US)

(73) Assignee: Oracle International Corporation, Redwood Shores, CA (US)

( * ) Notice: Subject to any disclaimer, the term of this patent is extended or adjusted under 35 U.S.C. 154(b) by 1416 days.

(21) Appl. No.: 11/028,489

(22) Filed: Dec. 30, 2004

(65) Prior Publication Data
US 2005/0177507 A1 Aug. 11, 2005

Related U.S. Application Data

(63) Continuation-in-part of application No. 09/777,168, filed on Feb. 5, 2001, now Pat. No. 6,882,983.

(60) Provisional application No. 60/533,816, filed on Dec. 30, 2003.

(51) Int. Cl.
*G06Q 40/00* (2012.01)
*G07B 17/00* (2006.01)

(52) U.S. Cl. .......................................... 705/40; 705/30

(58) Field of Classification Search ..................... 705/30
See application file for complete search history.

(56) References Cited

U.S. PATENT DOCUMENTS

| 4,491,725 A | 1/1985 | Pritchard |
| 4,799,156 A | 1/1989 | Shavit et al. |
| 4,972,318 A | 11/1990 | Brown et al. |
| 5,159,667 A | 10/1992 | Borrey et al. |
| 5,568,627 A | 10/1996 | Leshay et al. |
| 5,717,989 A | 2/1998 | Tozzoli et al. |
| 5,794,207 A | 8/1998 | Walker et al. |
| 5,832,460 A | 11/1998 | Bednar et al. |

(Continued)

FOREIGN PATENT DOCUMENTS
WO  WO 97/29445 A1  8/1997

OTHER PUBLICATIONS

Seven pages from website: www.miradiant.com.

(Continued)

*Primary Examiner* — Fahd Obeid
(74) *Attorney, Agent, or Firm* — Kilpatrick Townsend & Stockton LLP

(57) ABSTRACT

A system and method are provided for processing transactions between at least one buying company and at least one selling company using a central datastore accessible to users from the buying company and selling company. Purchase order and invoice data are obtained and compared to identify a matched record having purchase order data and corresponding invoice data. A collaborative data set in the central datastore is created, based in part on the matched record and storing in the datastore detailed settlement data regarding settlement of the matched record of purchase order data and corresponding invoice data. A complete settlement transaction history is stored by providing for storage of additional settlement data in the central datastore, wherein credit memos, debit memos regarding the invoice, the purchase order of the matched record, and/or other documents related to the transaction are stored as part of the collaborative data set.

26 Claims, 30 Drawing Sheets

U.S. PATENT DOCUMENTS

| | | |
|---|---|---|
| 5,903,878 A | 5/1999 | Talati et al. |
| 5,915,022 A | 6/1999 | Robinson et al. |
| 5,950,178 A | 9/1999 | Borgato |
| 5,970,475 A | 10/1999 | Barnes et al. |
| 5,991,750 A | 11/1999 | Watson |
| 6,006,199 A | 12/1999 | Berlin et al. |
| 6,009,414 A | 12/1999 | Hoshiya et al. |
| 6,026,374 A | 2/2000 | Chess |
| 6,044,362 A | 3/2000 | Neely |
| 6,058,380 A | 5/2000 | Anderson et al. |
| 6,097,834 A | 8/2000 | Krouse et al. |
| 6,209,111 B1 | 3/2001 | Kadyk et al. |
| 6,317,737 B1 | 11/2001 | Gorelik et al. |
| 6,330,551 B1 | 12/2001 | Burchetta et al. |
| 6,341,265 B1 | 1/2002 | Provost et al. |
| 6,343,275 B1 | 1/2002 | Wong |
| 6,360,211 B1 | 3/2002 | Anderson et al. |
| 6,385,595 B1 | 5/2002 | Kolling et al. |
| 6,470,490 B1 | 10/2002 | Hansen |
| 6,487,285 B2 | 11/2002 | Gilles et al. |
| 6,507,813 B2 | 1/2003 | Veditz et al. |
| 6,507,826 B1 | 1/2003 | Maners |
| 6,554,183 B1 | 4/2003 | Sticha et al. |
| 6,560,608 B1 | 5/2003 | Tomm et al. |
| 6,578,011 B1 | 6/2003 | Forward |
| 6,601,057 B1 | 7/2003 | Underwood et al. |
| 6,839,690 B1 | 1/2005 | Foth et al. |
| 6,868,401 B1 | 3/2005 | Carpenter et al. |
| 6,928,411 B1 * | 8/2005 | Fox et al. .......................... 705/1 |
| 6,968,319 B1 | 11/2005 | Remington et al. |
| 7,003,494 B2 | 2/2006 | Beach et al. |
| 7,206,768 B1 * | 4/2007 | deGroeve et al. ............... 705/54 |
| 2002/0052812 A1 | 5/2002 | Braverman |
| 2002/0065736 A1 * | 5/2002 | Willner et al. .................. 705/26 |
| 2002/0082990 A1 | 6/2002 | Jones |
| 2002/0178021 A1 * | 11/2002 | Melchior et al. .................. 705/1 |

OTHER PUBLICATIONS

Taylor, T.C. "Office Products firms begin test of Computerized Orders," Sales and Marketing Management, vol. 134, No. 7, p. 113, May 1985. Abstract.

* cited by examiner

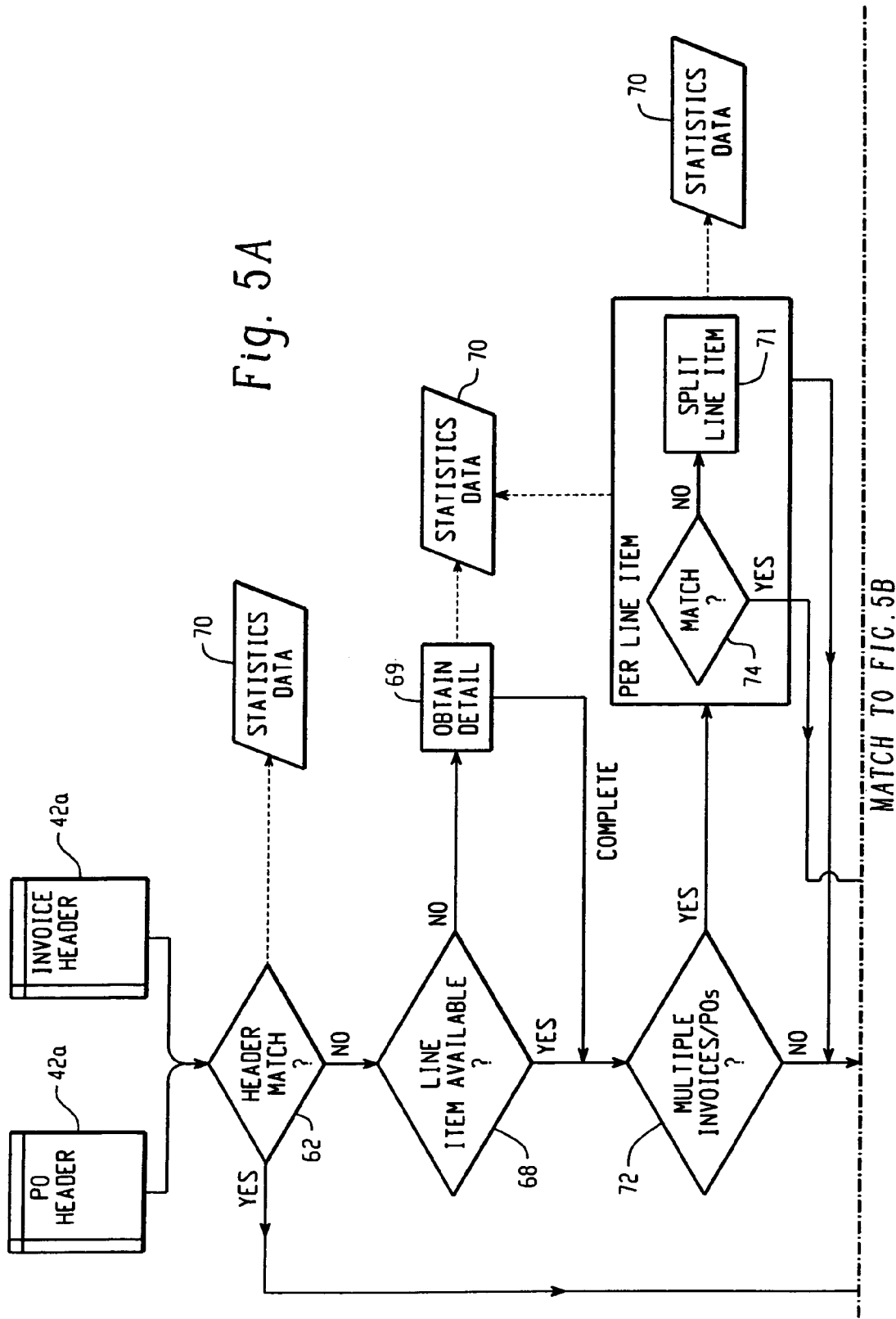

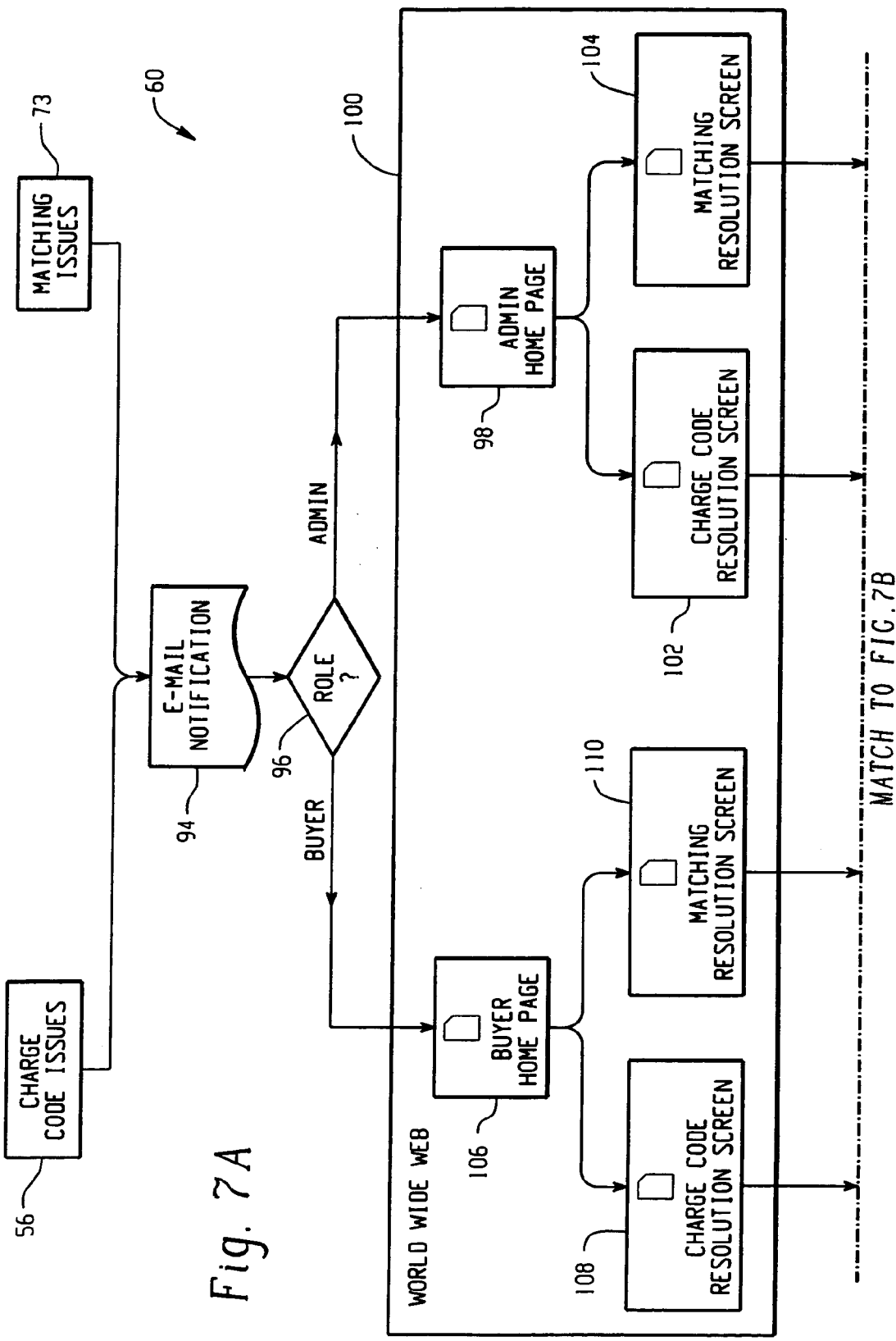

METHOD AND SYSTEM FOR PROCESSING TRANSACTIONS

CROSS-REFERENCE TO RELATED APPLICATIONS

The present application is a continuation-in-part of U.S. patent application Ser. No. 09/777,168 filed Feb. 5, 2001 (issued Apr. 19, 2005 as U.S. Pat. No. 6,882,983) and also claims the benefit of priority to U.S. Provisional Application Ser. No. 60/533,816 filed Dec. 30, 2003. The contents of applications listed in this paragraph are incorporated by reference for all purposes.

BACKGROUND OF THE INVENTION

1. Field of the Invention

The technology described herein relates to processing business transactions, and, more particularly, to a method and system for providing a single transaction point to process business transactions between multiple trading partners.

2. Description of Related Art

When one company, a purchaser, desires to buy products from another company, a supplier, an order is traditionally transmitted by the buying company to the selling company via a purchase order. The purchase order may be for a single product or for more than one product. If more than one product has been ordered, generally the purchase order will have a line item entry for each separate product. Often, a particular individual associated with the buying company, typically designated a "buyer," is responsible for each particular purchase order. A company may have one or more such buyers.

The selling company then fills the order and sends the product(s) to the buying company. The buying company generally notes the quantity of product received on the purchase order, creating a receipt document. After the selling company has shipped the product(s) to the buying company, the selling company generates and sends to the buying company an invoice for payment for the product(s). Usually, the invoice will have line item entries corresponding to those line item entries on the purchase order and receipt document. Sometimes the invoice will have line item entries corresponding to the line items on more than one purchase order or receipt document. This invoice corresponds to a receivable asset of the selling company associated with the amount due from the buying company.

The selling companies may also sell the receivable associated with the invoice to a third party, such as a bank or other receivables factoring party, based on a discount from the receivable amount. This allows the selling company to receive the cash before the invoice is paid to better manage the cash flow. This also shifts the risk to the third party that the buying company will timely pay the invoice and will have no disputes with the invoice information. This is known as factoring.

The current infrastructure in both traditional and internet business-to-business transactions is highly fragmented with buying companies and selling companies each dealing with hundreds or thousands of parties, purchase orders, invoices, and receipt documents. A selling company's billing data is a component of a buying company's accounts payable data. A buying company's remittance data is a component of a selling company's accounts receivable data. Further, a company may be a buying company for some products and a selling company for other products.

For each buying company, there are many selling companies with which it is a trading partner. For each selling company, there are many buying companies with which it is a trading partner. The buying companies and the selling companies must each track their accounts payable and accounts receivable information for each of the companies with which they do business. This can be illustrated as in FIG. 1, representing the traditional interactions between businesses.

Thousands of companies each perform billing, invoice matching, and reconciliation activities independently and redundantly, despite the fact that they are all using the same source data, namely, the data from the purchase orders and corresponding invoices and receipt documents. The results of these activities are then shared between these companies via remittances, short pays, claims, etc. This business process can create unnecessary administrative confusion and expense.

Electronic billing, remittance, payment, and tracking technologies have generated limited savings because they have left the reconciliation environment within each individual company. Also, web-based billing and payment solutions have achieved some success in moving information between companies, but have required companies to maintain their own internal accounts payable and accounts receivable functions which may require a significant commitment of resources.

There are existing systems that coordinate customer billings and receipts for a single selling company. However, such systems generally do not allow for the buying companies that are customers of that selling company to access the financial information that is related to the buying company's account. Likewise, such systems generally do not coordinate the supplier billings and receipts for the buying company for suppliers other than that selling company.

SUMMARY OF THE INVENTION

Accordingly, one object of the present invention is to provide improved systems and methods for invoice and purchase order reconciliation.

Another object of the present invention is to improve the accuracy of transaction settlement post-audits.

Another object of the present invention is to provide devices and methods for enabling both the buyer and seller to more quickly settle transactions and reduce problems that may typically be caught in a post audit.

Another object of the present invention is to provide devices and methods to allow for transaction insight into the other trading parties, business process, efficiencies, limitations, successes, etc. thus creating a more accurate view of both parties efforts in the financial and physical supply chain.

Yet another object of the present invention is to capture and link together in the system all documents, memos, images, files, notes and correspondence related to the financial settlement of the transaction.

Still a further object of the present invention is to provide methods to track and capture not only the original payment decision and/or deduction but also all dispute requests, supporting documentation and subsequent credits & debits until both parties are satisfied with the final settlement or recognize that any additional efforts will not affect the outcome. This information as it is brought into the system is then shared between both parties for a single source of data for the transaction.

At least some of these objects are achieved by some embodiments of the present invention.

In one embodiment of the present invention, a method is provided for processing transactions between at least one buying company and at least one selling company which results in the creation of a new collaborative data set. The method comprises providing a central datastore accessible to users from the buying company and users from the selling company. Purchase order and invoice data are obtained and compared via a computer, to identify a matched record having purchase order data and corresponding invoice data. A collaborative data set in the central datastore is created, based in part on the matched record and storing in the datastore detailed settlement data regarding settlement of the matched record of purchase order data and corresponding invoice data. The method stores a complete settlement transaction history by providing for storage of additional settlement data in the central datastore, wherein credit memos, debit memos regarding the invoice, the purchase order of the matched record, and/or other documents related to the transaction are stored as part of the collaborative data set.

In one embodiment of the present invention, a method is provided for processing transactions between at least one buying company and at least one selling company which results in the creation of a new collaborative data set. The method comprises providing a central datastore accessible to users from the buying company and users from the selling company; obtaining via a computer network purchase order data having at least one entry, the purchase order data including purchase order header information and purchase order detail information; obtaining via a computer network invoice data having at least one entry, the invoice data including invoice header information and invoice detail information; comparing via a computer, selected purchase order data and corresponding selected invoice data to identify a matched record having purchase order data and corresponding invoice data; creating a collaborative data set in the central datastore based in part on the matched record and storing in the datastore detailed settlement data regarding settlement of the matched record of purchase order data and corresponding invoice data; providing for storage of additional settlement data in the central datastore, wherein credit memos, debit memos regarding the invoice and/or the purchase order of the matched record are stored as part of the collaborative data set; if users from the buying company and/or selling company dispute settlement of the transaction, then: 1) providing for storage of settlement dispute data from the selling company which is stored as part of the collaborative data set; 2) providing for storage of supporting images and documentation from the selling company which are stored as part of the collaborative data set; 3) providing for storage of settlement dispute data from the buying company which is stored as part of the collaborative data set; 4) providing for storage of supporting images and documentation from the buying company which is stored as part of the collaborative data set. The method may further involve reconciling the transaction using the matched record and settlement dispute data stored in the datastore.

The method may also include a transaction that is reconciled using only data and documents captured and stored in the datastore as part of the collaborative data set. Users from the buying company and selling company may view, reconcile, adjudicate and report on all financial transactions between the trading partners. Documents, memos, images, files, notes and correspondence related to the financial settlement of a transaction may be captured and linked together in the database. The database may include original payment decision and/or deduction but also all dispute requests, supporting documentation and subsequent credits & debits entered until both parties are satisfied with the final settlement. Information brought into the database may then be shared between both parties for a single source of data for the transaction. All of the documents related to the transaction may be stored at a central datastore to create a more accurate view of both parties efforts in the financial and physical supply chain. Of course, this central datastore may also be viewed as being a server which may be part of a server farm or distributed storage network. However, the users from buyers and sellers would come to this "single" platform to do their settlement transactions, even if on the backend, some embodiments may have the servers with the datastore in a distributed architecture.

Embodiment of the present invention may allow the at least one buying company and the at least one selling company access to selected data in the database comprises providing a web page accessible by the buying company and a web page accessible by the selling company via a global computer network. The purchase order header information may comprise of a purchase order number, a client identification, a vendor identification, and a purchase order date. The purchase order detail information may comprise of the purchase order header information, a quantity ordered for each purchase order entry, an item identification for each purchase order entry, a unit price for each purchase order entry, and a charge code for each purchase order entry. The invoice header information may comprise of an invoice number, a client identification, a vendor identification, and an invoice date. The invoice detail information may comprise of the invoice header information; a quantity shipped for each invoice entry; an item identification for each invoice entry; and an extended price for each invoice entry. In some embodiments of the invention, the step of obtaining purchase order data comprises obtaining the purchase order data in electronic format. The step of obtaining purchase order data may further comprise of obtaining the purchase order data via a global computer network.

In some embodiments, the step of obtaining invoice data comprises obtaining the invoice data in electronic format. The step of obtaining invoice data may further comprises obtaining the invoice data via a global computer network. The step of obtaining purchase order data may comprise of obtaining the purchase order data in paper format. The method may further comprise of the step of converting the purchase order data to electronic format. The step of obtaining invoice data comprise of obtaining the invoice data in paper format. The method may further comprise of the step of converting the invoice data to electronic format. The steps may be conducted by a party other than the buying company or the selling company. The method may comprise of the step of automatically comparing selected purchase order data and corresponding selected invoice data comprises performing an automated comparison using a computer. The method may comprise of using a single platform provided for handling all transaction for trade settlement.

In another possible configuration of the present invention, a method is provided for tracking transaction settlement between at least one buying company and at least one selling company. The method comprises providing a central datastore accessible to users from the buying company and users from the selling company; obtaining via a computer network purchase order data having at least one entry, the purchase order data including purchase order header information and purchase order detail information; obtaining via a computer network invoice data having at least one entry, the invoice data including invoice header information and invoice detail information; comparing via a computer selected purchase order data and corresponding selected invoice data to identify a matched record having purchase order data and corresponding invoice data; creating a collaborative data set in the central datastore based in part on the matched record and any subsequent settlement history; capturing post-match, settlement history by storing all additional settlement data to be used to as part of the same collaborative data set in the central datastore, wherein at least one of the following is stored: credit memos, debit memos regarding the invoice and/or the purchase order of the matched record, settlement dispute data from the selling company, supporting images and documentation from the selling company, settlement dispute data from the buying company, supporting images and documentation from the buying company. In the method, users from the buying company and users from the selling company may access the collaborative data set to reconcile the transaction using the matched record settlement transaction history and supporting documentation stored in the datastore.

In some embodiments, the transaction is reconciled using only data and documents captured and stored in the datastore as part of the collaborative data set. Users from the buying company may view additional settlement data and documents added into the collaborative data set by the selling company and vice versa. Additionally, users from the buying company may review additional settlement data added by users from the selling company; and users from the selling company reviewing additional settlement data added by users from the buying company. This is an iterative process and the reviewing steps may be repeated between the buying company and selling company until a final settlement is reached or agreed upon.

In another embodiment of the present invention, an electronic transaction processing system including a computer network, a processing unit, and at least one data storage unit, is provided for performing steps comprising: providing a central datastore accessible to users from a buying company and users from a selling company; obtaining via the computer network purchase order data having at least one entry, the purchase order data including purchase order header information and purchase order detail information; obtaining via the computer network invoice data having at least one entry, the invoice data including invoice header information and invoice detail information; comparing via a computer selected purchase order data and corresponding selected invoice data to identify a matched record having purchase order data and corresponding invoice data; creating a collaborative data set in the central datastore based in part on the matched record and any subsequent settlement history; capturing post-match, settlement history by storing all additional settlement data to be used to as part of the same collaborative data set in the central datastore, wherein at least one of the following is stored: credit memos, debit memos regarding the invoice and/or the purchase order of the matched record, settlement dispute data from the selling company, supporting images and documentation from the selling company, settlement dispute data from the buying company, supporting images and documentation from the buying company; users from the buying company and users from the selling company accessing the collaborative data set to reconcile the transaction using the matched record settlement transaction history and supporting documentation stored in the datastore.

In a still further embodiment of the present invention, a method is provided for processing transactions. The method comprises receiving invoice data and receipt data for a plurality of transactions and storing the data in a system database; segmenting the invoice and receipt data into a plurality of segments using one or more user defined segmenting parameters, each segment including a portion of the received invoice data and receipt data based upon the user defined segmenting parameters; for each of the segments, automatically matching the portion of the received invoice data and receipt data within the segment according to a predefined match strategy comprising a plurality of matching rules; and for each invoice and receipt that are matched in the automatic matching step, assigning a unique match identifier to the invoice and receipt and storing the invoice and receipt along with the match identifier in the system database.

In yet another embodiment of the present invention, a graphic user interface is provided for transaction matching. The user interface comprises a screen presenting the user with: a first portion showing invoice and purchase order match information; a second portion listing invoice line items; a third portion listing receipt of goods line items, wherein the second portion and third portion are aligned horizontally so that the line items will also align in a horizontal manner to facilitate comparison. The user interface may also include a fourth portion listing debit memos and credit memos.

A further understanding of the nature and advantages of the invention will become apparent by reference to the remaining portions of the specification and drawings.

BRIEF DESCRIPTION OF THE DRAWINGS

FIGS. 5A and 5B are flow diagrams of an example matching process of the system of FIG. 2;

FIGS. 7A and 7B are flow diagrams of an example resolution process of the system of FIG. 2;

FIG. 15B is a view match notes screen interface operable by a user of the system in order to identify and view notes associated with a particular match;

FIG. 17 is a reconciliation queue interface screen operable by a user of the system in order to begin the manual reconciliation process described in FIG. 13;

FIG. 18 is a header match screen interface operable by a user of the system in order to manually reconcile invoices and receipts at the header level;

FIG. 20 is a document research queue interface screen;

FIG. 21 is a view document screen interface; and

FIG. 22 is another example view match screen interface.

DESCRIPTION OF THE SPECIFIC EMBODIMENTS

Figure 1:
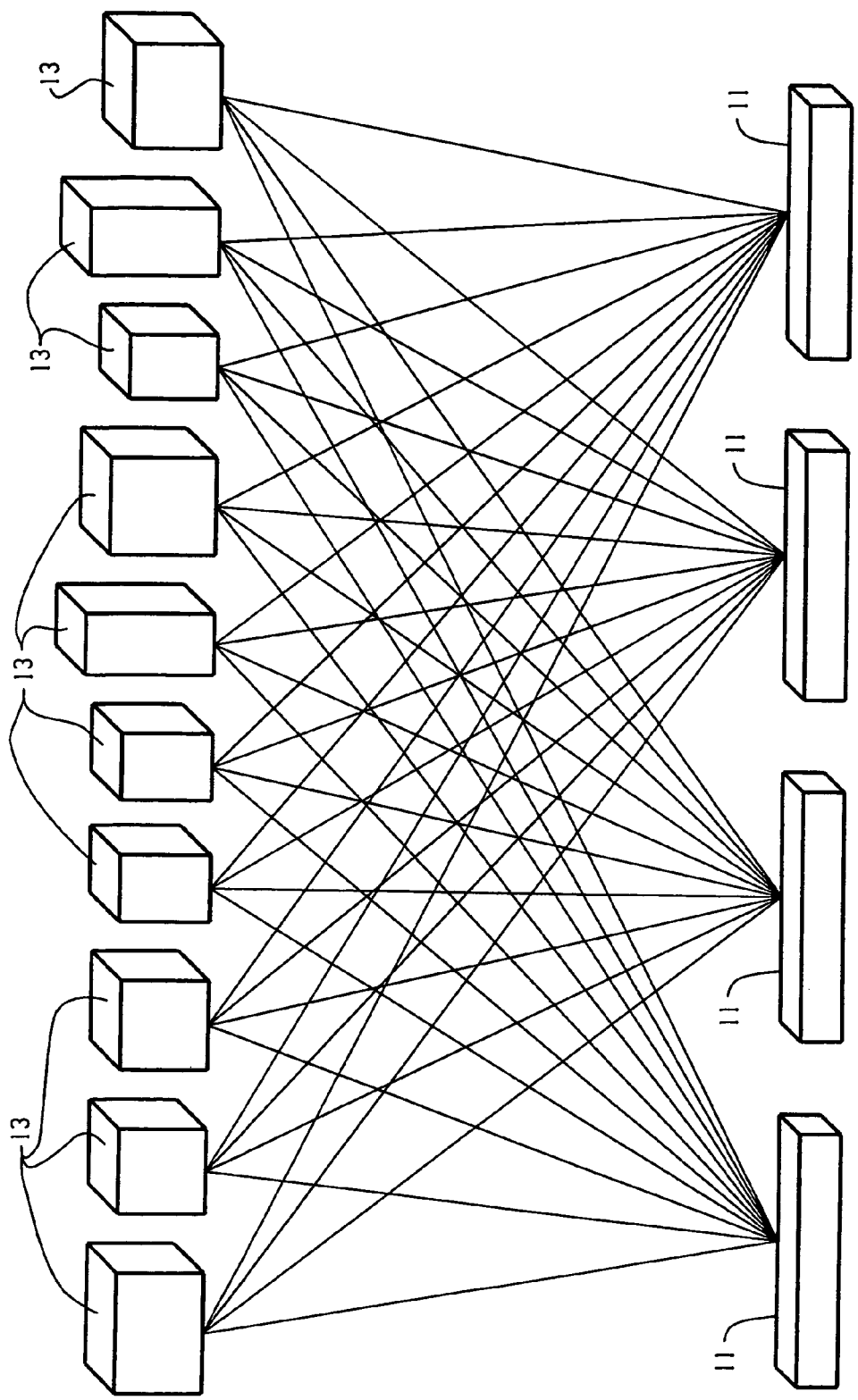
FIG. 1 is a schematic representation of a traditional prior art transaction management system.

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "a bar code" may include multiple bar codes, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for having a cassette loader, this means that the cassette loader feature may or may not be present, and, thus, the description includes structures wherein a device possesses the cassette loader feature and structures wherein the cassette loader feature is not present.

A "server" in a hardware configuration may be a computer such as a personal computer (PC) or other intelligent device. A server typically performs the bulk of the centralized or generalized tasks in the network and often has more memory, processing speed, and storage than the other device on the client-server network. Alternatively, the server may perform specialized tasks such as but not limited to, distributing electronic mail, data storage or printing. In the software arrangement, a "server" typically is a program that provides data, stores data, or provides some service to other programs to which the server is connected. A server may be a program with higher priority, greater memory, or greater capabilities compared to the other programs connected through the network. A server also may be a program that includes specialized capabilities or has higher priority with respect to certain tasks or functions.

A "client" in the software arrangement is generally a program used by a user. A client program typically makes use of data, processing, storage, or other resources of another program. A client may be used to communicate with a source or destination through a higher priority, more powerful, more capable or different program. The client may run on a computer such as but not limited to, a personal computer (PC), intelligent device, personal digital assistant (PDA) or workstation used by a user. In use, the client may carryout tasks in the process of which the client may request information or otherwise may use the resources of another object such as the server or another client to accomplish such tasks.

FIG. 1 schematically illustrates the traditional prior art approach to management of financial and accounting transactions between trading partners, including buying companies 11 and selling companies 13. It is to be understood that buying companies 11 and selling companies 13 include individuals, sole proprietorships, partnerships, limited liability companies, corporations, and any other business or non-business entities engaged in the buying and selling of products that may be included in purchase orders and/or invoices. Further, the term "products" includes raw materials, finished products, services, and/or any other item that may be included in purchase orders, invoices, or other billing arrangements.

Figure 2:
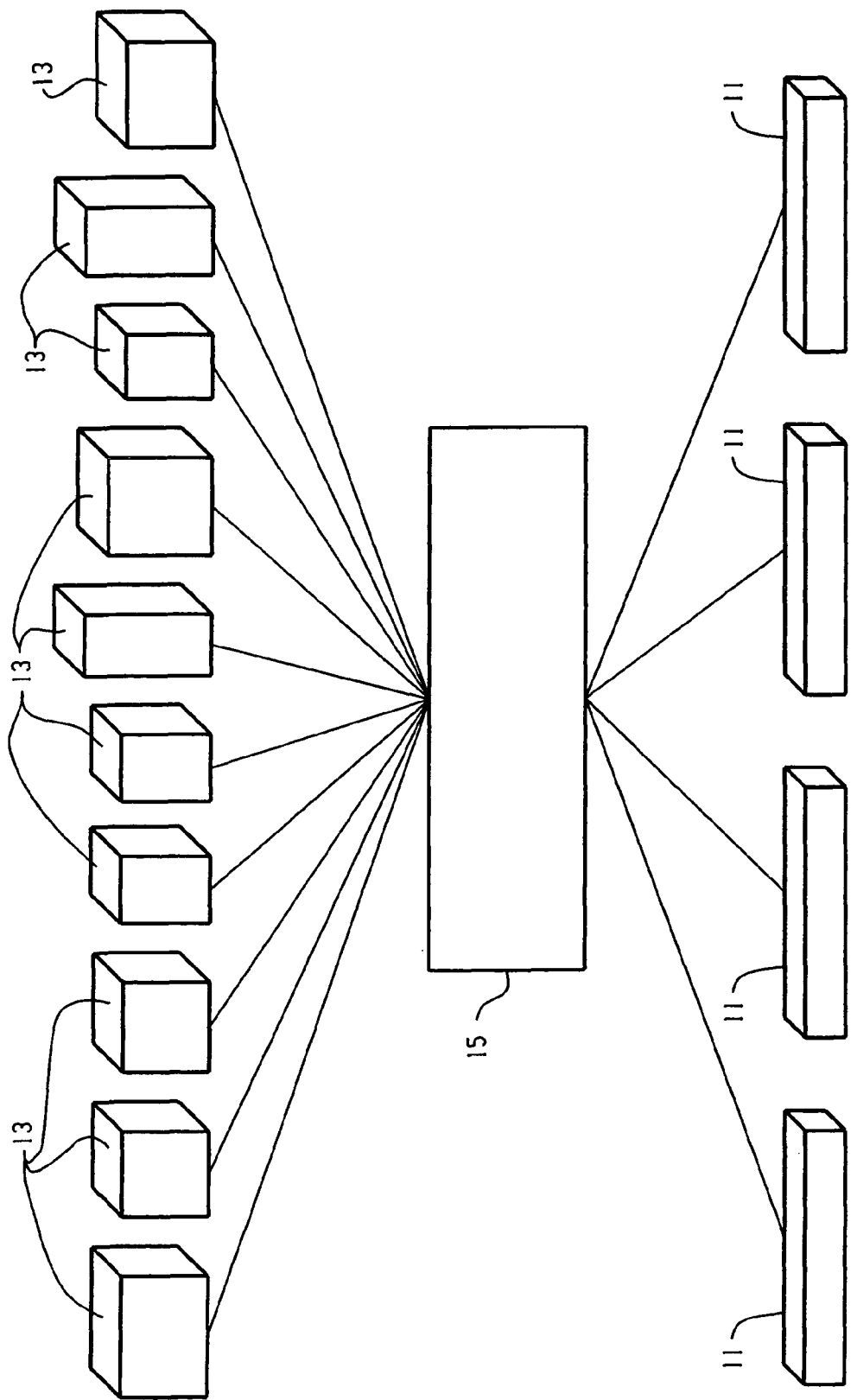
FIG. 2 is a schematic representation of an example transaction management system in accordance with the present invention.

FIG. 1 shows that individual buying companies 11 and selling companies 13 internally manage the financial and accounting data related to their trading partners. This leads to inefficiencies and other difficulties as described above. FIG. 2 presents a schematic representation of an example transaction management system in accordance with the present invention in which a single interactive platform 15 is provided for both buying companies 11 and selling companies 13 to utilize as a single transaction point to manage financial and accounting transactions with their trading partners. Platform 15 may be operated by a third party and may be accessible by all parties via a computer network. Preferably, this computer network is a global computer network, and most preferably the computer network is the internet.

Both buying companies 11 and selling companies 13 provide their purchase order data, receipt data, and invoice data to the interactive platform 15, where the data is managed, discrepancies resolved, payments provided for, and records kept. The trading partners complete transactions and communicate with each other via the interactive platform 15. Reports relating to transactions, financial data, and other accounting data are available via the interactive platform 15.

The interactive platform 15 provides a unique method and system for a third party to manage all of the accounts payable and accounts receivable for buying companies 11 and selling companies 13. Further, interactive platform 15 may provide for centralized payment schemes, as authorized by buying companies 11, and can conduct all of the account payable operations currently processed within the buying company 11. Likewise, the interactive platform 15 can conduct all of the account receivable operations currently processed within the selling company 13. The interactive platform 15 conducts these accounts receivable and accounts payable operations utilizing identical data from a single database.

Interactive platform 15 may also provide for management of transactions between buying companies 11 or selling companies 13 with a trading partner that does not provide corresponding accounting information to the interactive platform 15. For example, if a buying company 11 purchases goods from a trading partner that does not provide invoice data to the interactive platform 15, the input of purchase order information, receipt information, and invoice information may still occur via the buying company 11, and the buying company 11 will still enjoy the advantages of using the interactive platform 15. Also, the buying company 11 may direct the selling company 13 to send all invoices to the interactive platform 15 as part of the billing arrangements with that selling company 13. However, the trading partner that does not provide information to the interactive platform 15 may not have access to the data in the interactive platform 15 or the advantages of its use.

The interactive platform 15 is not limited to traditional goods-oriented transactions, but is also applicable to exchanges of services, routine payments, or any other payable or receiving function traditionally performed by an accounting department. For example, the interactive platform 15 may be utilized to provide for payment of regular utility bills. A rule or other operating parameter may be established for a buying company 11 that an electric bill within a predetermined range is authorized for payment. The selling company 13, which happens to be an electric utility, then provides the payment due information to the interactive platform 15, and payment is automatically provided for if the amount is within the authorized predetermined range. Any amounts outside the predetermined range would trigger a resolution process similar to that described below in relation to FIG. 7.

The buying company 11 may access the interactive platform 15 at any time for reports regarding the payments of electric utility bills to that selling company 13, and the selling company 13 may access the interactive platform 15 at any time for reports regarding the payments made to it by that buying company 11 or any other buying company 11. Of course, that buying company 11 would not have access to reports of information regarding payment to that selling company 13 by any other buying company 11. In such a way, a buying company 11 may automate all routine payment processes and increase accounting efficiency.

Other examples of the utilization of the interactive platform 15 include selling companies 13 that are insurance companies and buying companies 11 that are the insured companies. Procedures similar to those described above could be implemented to automate provisions for insurance.

Figure 3:
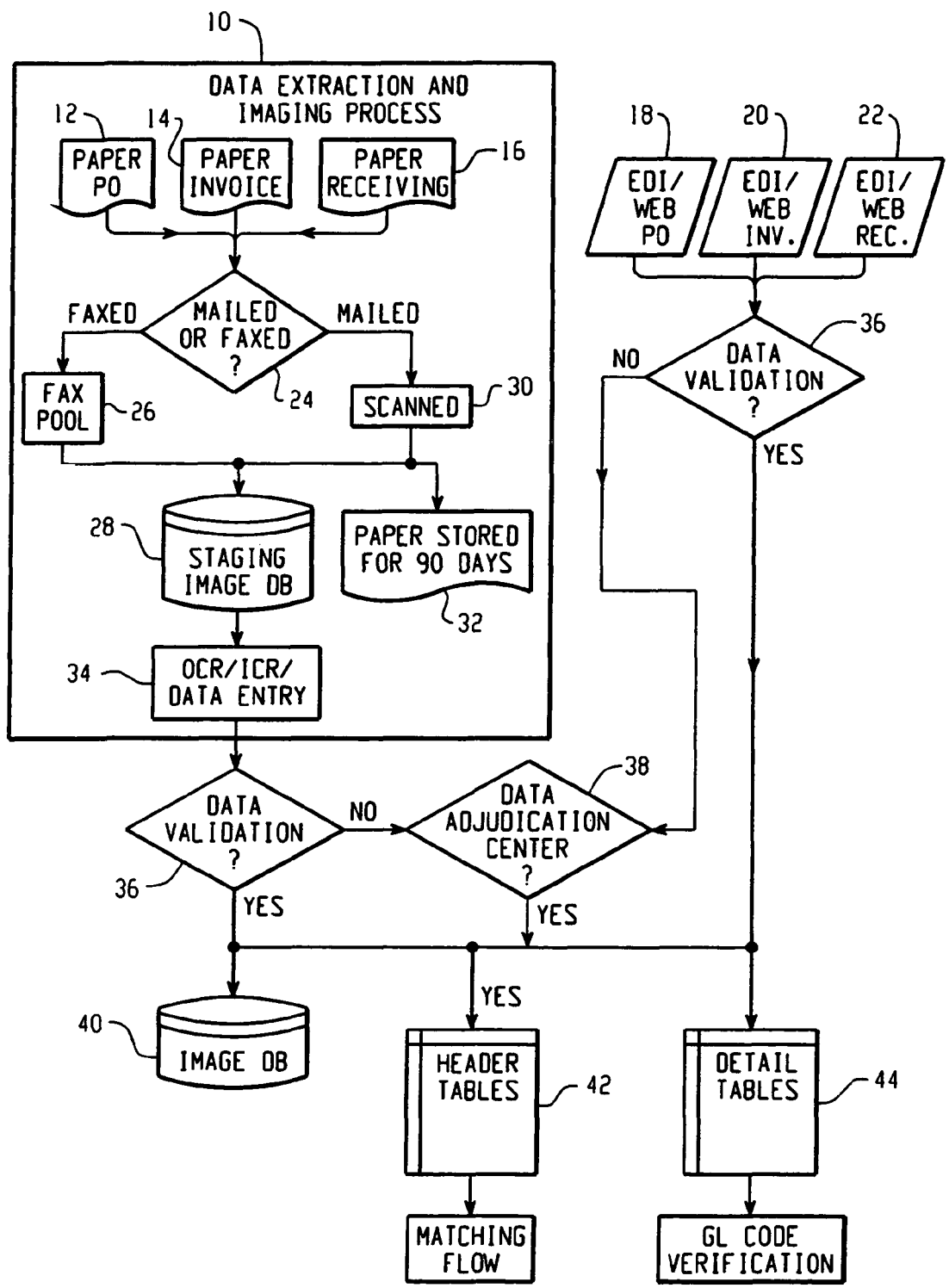
FIG. 3 is a flow diagram of the input data flow of the example system of FIG. 2.

FIG. 3 is a flow diagram of the input data flow of the example system of FIG. 2. Accounting data for the method of the present invention may be obtained in either paper format, such as paper purchase orders 12, paper invoices 14, or paper receiving document 16, or in electronic format, such as electronic data interface ("EDI")/Web purchase orders 18, EDI/Web invoices 20, or EDI/Web receiving documents 22. These documents may be received via the World Wide Web over the Internet or through an EDI system.

The paper documents 12, 14, and 16 may be received via paper delivery service (e.g., U.S. mail) or via facsimile transmission, etc. The next step is to determine whether the paper is received via mail or facsimile transmission, as indicated by step 24. If the paper documents are received via fax, then the images will be sent to a fax pool 26, and into a staging image database 28.

If the paper documents 12, 14, and 16 are received via paper delivery service, then the documents are scanned in step 30, using conventional scanning techniques. After the paper documents 12, 14, and 16 are scanned, the images resulting from the scan are provided to the staging image database 28. With paper documents 12, 14, and 16 that are received via paper delivery service, the hard paper copies are placed in storage 32. The paper may be stored for any amount of time, preferably 90 days.

Once the images of the paper documents 12, 14, and 16 are stored in the staging image database 28, they are then provided to the data entry step 34 in which the images are translated into an electronic format that is suitable for further processing.

Once the data has been entered into the system through step 34, the data is evaluated and validated in step 36 to identify data that may be missing, incorrectly input, etc. If the data validation step 36 identifies any problems, then the document '0 is provided to the data adjudication center 38 for resolution of any problems. The data adjudication center 38 may provide for contact with the provider of the information for correction of that information. Such contact may be conducted as part of the workflow resolution 60 process described in FIG. 7, or may be separate from that process.

The electronic data 18, 20, and 22 also undergoes the data validation step 36 and is provided to the data adjudication center 38 for resolution of any problems with that data.

Once the documents have passed the data validation step 36, the images of the documents will be stored in the image database 40. Specific data from the images will be loaded into the header tables 42 and/or the detail tables 44.

For purchase order documents 12, 18, header table 42 data may include a purchase order number, a client number or other identification, a vendor number or other identification, a buyer number or other identification, a purchase order date, and/or an order date. For invoice documents 14, 20, header table 42 data may include an invoice number, a purchase order number, a client number or other identification, a vendor number or other identification, a buyer number or other identification, an invoice date, and/or an order date. The invoice documents 14, 20 also have an invoice total cost, which is the total cost or price of the product(s) shipped to the buying company 11 from the selling company 13.

For purchase order documents 12, 18, detail table 44 data may include the purchase order header information and detailed entry information by line of the purchase order including an item number or other identification, a quantity ordered of that item, a cost per item unit, an extended price for that item, a charge code for that item, and a quantity received for that item. For invoice documents 14, 20 detail table 44 data may include the invoice header information and detailed entry information for each line of the invoice, including an item number or other identification, a quantity of the item shipped, a unit cost or price for the item, and an extended cost or price for the item. Likewise, if freight charges, insurance charges, etc., are included as separate items, then these could also be included as separate line items.

Receiving documents 16, 22 provide receipt data corresponding to the product(s) actually received by the buying company 11, on an item-by-item basis. This information is provided by the buying company 11 and is combined with information from the purchase order to determine the total cost of goods received, which is the cost or price of the product(s) ordered that were actually received by the buying company 11. The total cost of goods received may be included in the purchase order header information 42a. The quantity of items received and the cost of individual items received may be included in the purchase order detail information 44a.

Figure 5B:
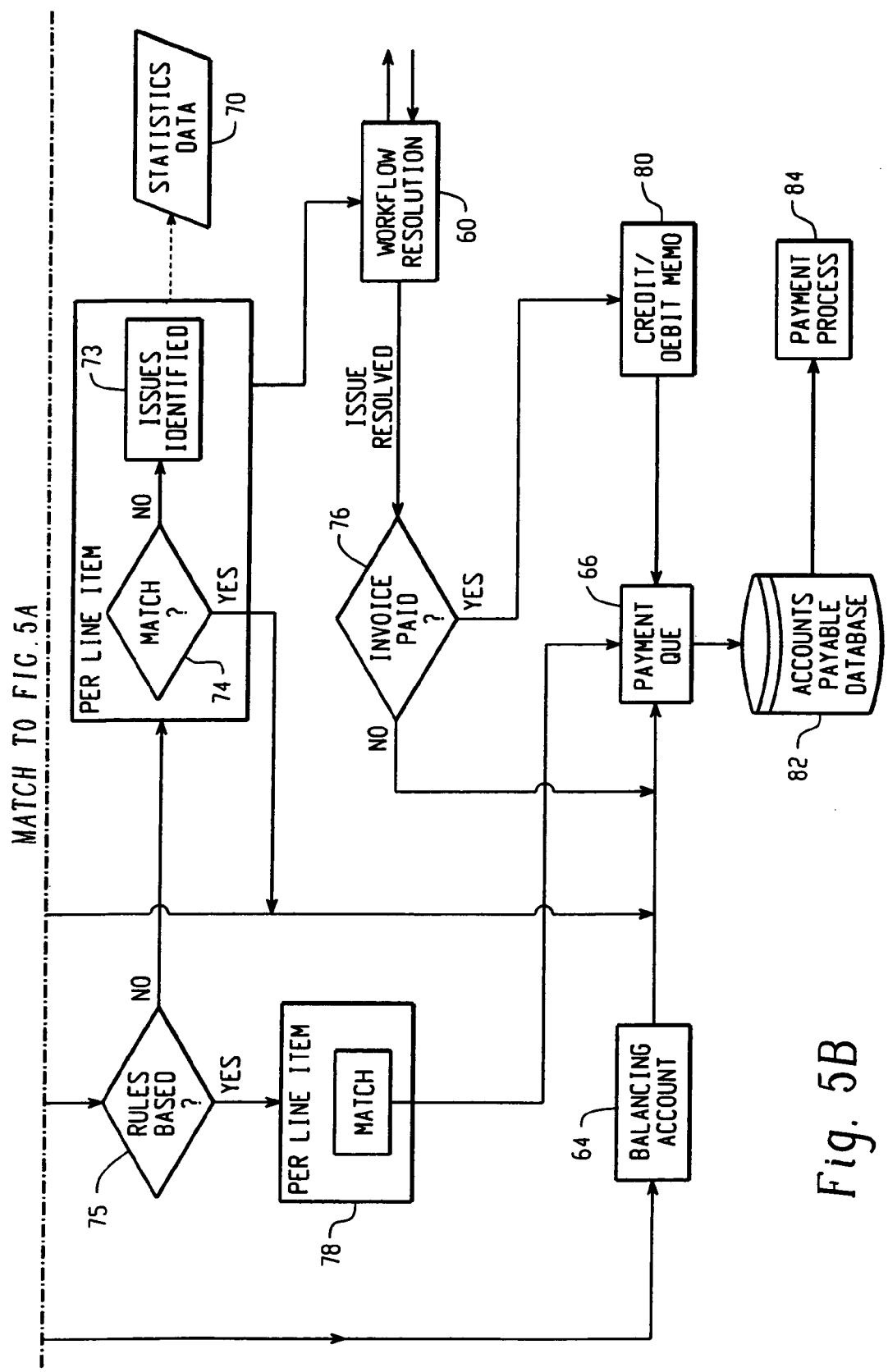

The data from the header tables 42 is provided to begin the exemplary matching flow process described in FIG. 5. The data from the detail tables 44 undergoes general ledger ("GL") charge code verification, in which the detailed codes set forth in the data of the detail tables 44, generally obtained from the purchase order, are compared to predetermined GL charge codes provided by the originator of the data.

Figure 4:
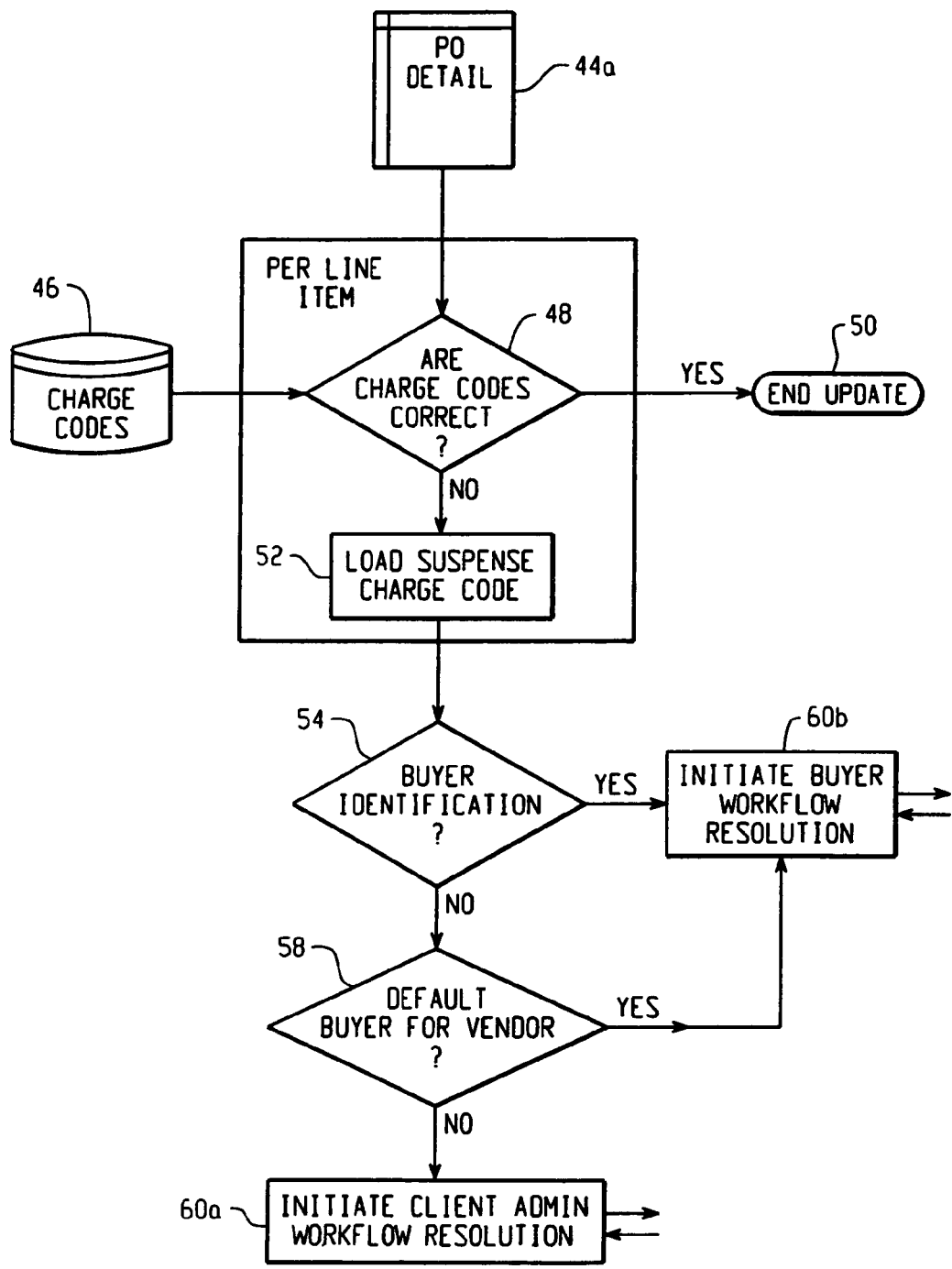
FIG. 4 is a flow diagram of an example charge code verification process of the example system of FIG. 2.

FIG. 4 is a flow diagram of an example charge code verification process of the example system of FIG. 2. The data from the detail tables 44a relating to purchase order 12, 18 information is compared to charge codes 46 that are provided by the originator of the purchase orders 12, 18. The comparison of the charge codes from the purchase order detail table 44a and the charge codes 46 occur on a line-by-line basis to ensure that the codes contained in the detail table 44*a* are valid codes. This step occurs as charge code verification step 48. If the codes from the detail table 44*a* match the charge codes 46, then the update of the codes is ended at step 50. If the charge code verification step 48 indicates that the charge code from the detail table 44*a* does not have a corresponding authorized code from charge codes 46, then suspense charge codes will be assigned to the items corresponding to the non-matching charge codes in step 52. A suspense charge code is an accounting placekeeper pending resolution of the correct charge code. The suspense charge code and the original charge code will then be associated with that particular item on the particular line in question.

Then step 54 queries the detail table 44*a* to determine if there was a buyer associated with the purchase order. If there is a buyer identified, then the buyer workflow resolution will be initiated in step 60*b*. In this step, the individual buyer associated with the purchase order in question is contacted (through the internet, web site, etc.) to resolve the discrepancies between the authorized charge codes from the charge code database 46 and the charge codes from the detail tables 44*a*.

If there is no buyer identified in the data from the detail tables 44*a*, then it is determined whether there is a default buyer for the vendor identified on the purchase order in step 58. This is determined by comparing the vendor from the data in the detail tables 44*a* with a predetermined list (not shown) of default buyers for vendors obtained from the originator of the purchase order 12, 18.

If there is a default buyer for the vendor identified in step 58, then the buyer workflow resolution 60*b* is initiated to resolve discrepancy between the charge codes. If there is not a default buyer for the vendor identified in step 58 and no buyer identified from the detail tables 44*a* in step 54, then the matter is referred to the client administrative workflow resolution 60*a*, discussed in greater detail below.

FIG. 5 is a flow diagram of an example matching process of the system of FIG. 2. Purchase order header information 42*a* is obtained from the header tables 42 and compared against invoice header information 42*b* obtained from the header tables 42. Corresponding purchase orders and invoices are selected based upon matching identified information, such as purchase order number, client number, and vendor number. Then the total cost of goods received and invoice total cost are compared in step 62 to determine if the total cost matches within a predetermined tolerance level. This tolerance level may be based on a dollar amount, percentage of total cost, or other criteria. If the total costs match within the tolerance, then whatever difference between the total costs are coded to a balancing account 64 and the invoice is then processed to the payment queue 66.

Whether the total costs match or not, the costs and matching status information is provided to the statistics area 70 for tracking and further compilation. The statistics area 70 may also be used to create a digital audit trail, in which transactions, resolutions of discrepancies, and access to the system by particular individuals may be tracked. If the total costs do not match, then the detail tables 44 corresponding to the purchase order and invoice are checked to see if detailed information regarding each line item on the purchase orders or invoices is available, as identified in step 68. Whether the total costs match or not, that information is provided to the statistics area 70 for tracking and further compilation. If the detail required is not available, then step 69 illustrates that the appropriate detail is obtained. This may be accomplished by obtaining the data from the image database 40, or accessing the data adjudication center 38 to have the appropriate data input. Whether the detailed information is available and the method of obtaining the detailed information are supplied to the statistics area 70.

In step 72, it is determined whether there are multiple invoices or purchase orders having matches with header information. For example, a single invoice may correspond to more than one purchase order, or the products from a single purchase order may have been shipped under different invoices. If there are multiple invoices and/or purchase orders, then the detail information regarding individual line items are compared for matching in step 74. If there are individual line item matches between the purchase orders, including receipt data, and the invoices, then those may be provided to the payment queue 66. If the line items of the associated purchase orders with receipt data and invoices do not match, then the unmatched line items are identified for further processing. All of this information is also provided to the statistics area 70.

Whether there may be multiple invoices for a particular purchase order is a set-up rule that may be selected by the customer. If a customer does not choose to allow multiple invoices per purchase order and a purchase order has more than one invoice matching the header information, this matter is forwarded to the workflow resolution process 60. If a customer does accept multiple invoices per purchase order, and the line item match 74 indicates that there is not a match for a particular purchase order line item because the corresponding invoice(s) has a lesser quantity than the purchase order or receipt data for that line item, then the line item is split in step 71 to become two line items—one with the quantity that is on the invoice or that was received and one line item with the remainder of the quantity that can be the subject of a different invoice or receiving document for the remaining quantity or part thereof.

If there were no multiple invoices or purchase orders, or if there were split line items from step 71, then the purchase orders with receipt data and invoices are compared with predetermined selections from the customer regarding the rules by which to pay the invoices in step 75. If there is not a preselected rule by which to pay the invoice associated with the purchase order or the split line items, then the line items from the detail tables 44 of the purchase order with receipt data are compared to those from the invoice to determine if there is a match 74. If there is a line item match (e.g., the item number, quantity, extended price matches between the purchase order and invoice), then the line item may be forwarded to the payment queue 66.

For line items that do not have corresponding matches between the purchase order with receipt data and the invoice, these issues are identified in step 73 and may be provided to the workflow resolution 60 for resolution. If the customer has allowed multiple invoices per purchase order, then the unmatched line items may be placed on hold for a period of time pending separate invoices. This period of time may also be selected by the customer, and may be of any duration. Preferably, this period of time does not extend past 30 days, beyond which the customer may be contacted through the workflow resolution 60. There may also be a provision for items that have been placed on back-order status, such that a separate period of time is specified before the issue is provided to the workflow resolution 60.

Data regarding line item matches and discrepancies are also provided to the statistics area 70. Once the issue is resolved through workflow resolution 60, step 76 queries whether the invoice or associated line item has been paid. If the invoice or associated line item has not been paid, then the information is provided to the payment queue 66. If the invoice has been paid, then a credit or a debit memo is generated in step 80 and provided to the payment queue 66.

If the invoice or line item is to be paid according to a rule, as identified in step 75, then the rule is applied to the matches in step 78 and the results are provided to the payment queue 66. One such rule that may be used is the "pay lower of the two rule." This is a set of rules that evaluates the invoice line item and the purchase order line item and compares extended price. This rule allows for the lower price between the two items to be paid for the quantity of items received, or the lowest quantity of the two line items is selected and an extended price is calculated based upon a predetermined formula. It will be readily apparent to one of ordinary skill in the art that there are many rules-based alternatives for resolving how an invoice or line items upon an invoice should be paid. A rules-based payment scheme may also be applied with multiple invoices and purchase orders.

The information from the payment queue 66 is provided to an accounts payable database 82, from which the payment process 84 is initiated. Differences between the amount invoiced and the amount paid are provided to the balancing account 64. The payment process 84 may be entirely controlled and contained by the originator of the purchase orders and outside the system of FIG. 2.

The information from the accounts payable database 82 may also be used in the process of factoring, described above, to create an improved process termed "approval factoring." Factoring, which is the selling of the receivable asset associated with amounts due to the selling company, is done at the time of the match (or approval for payment, discussed below) between the purchase order and receiving information or data with the invoice information or data, instead of the traditional method of selling the receivable at the time of invoice. This allows the factoring to occur based on a matched amount due. By factoring at the time of match or approval, the risk to the third party associated with the receivable asset is minimized, because the matching or approval for payment has already occurred and any discrepancies have already been resolved, or at least identified.

Because of this reduced risk, the discount from the face value of the receivable may be reduced and the selling company will pay less of a fee to better manage its cash flow by receiving the cash flow at known dates with minimal delay. Further, the factored amount may be based on the amount actually scheduled to be paid, instead of the invoice amount, and allows for factoring over multiple invoices having only partial matches. Thus, factoring may be done for individual line items from several invoices, instead of for an entire invoice, as is traditionally done. The third party may be the party implementing the transaction processing system or may be one or more other parties, such as a bank or other receivables factoring party.

Figure 6A:
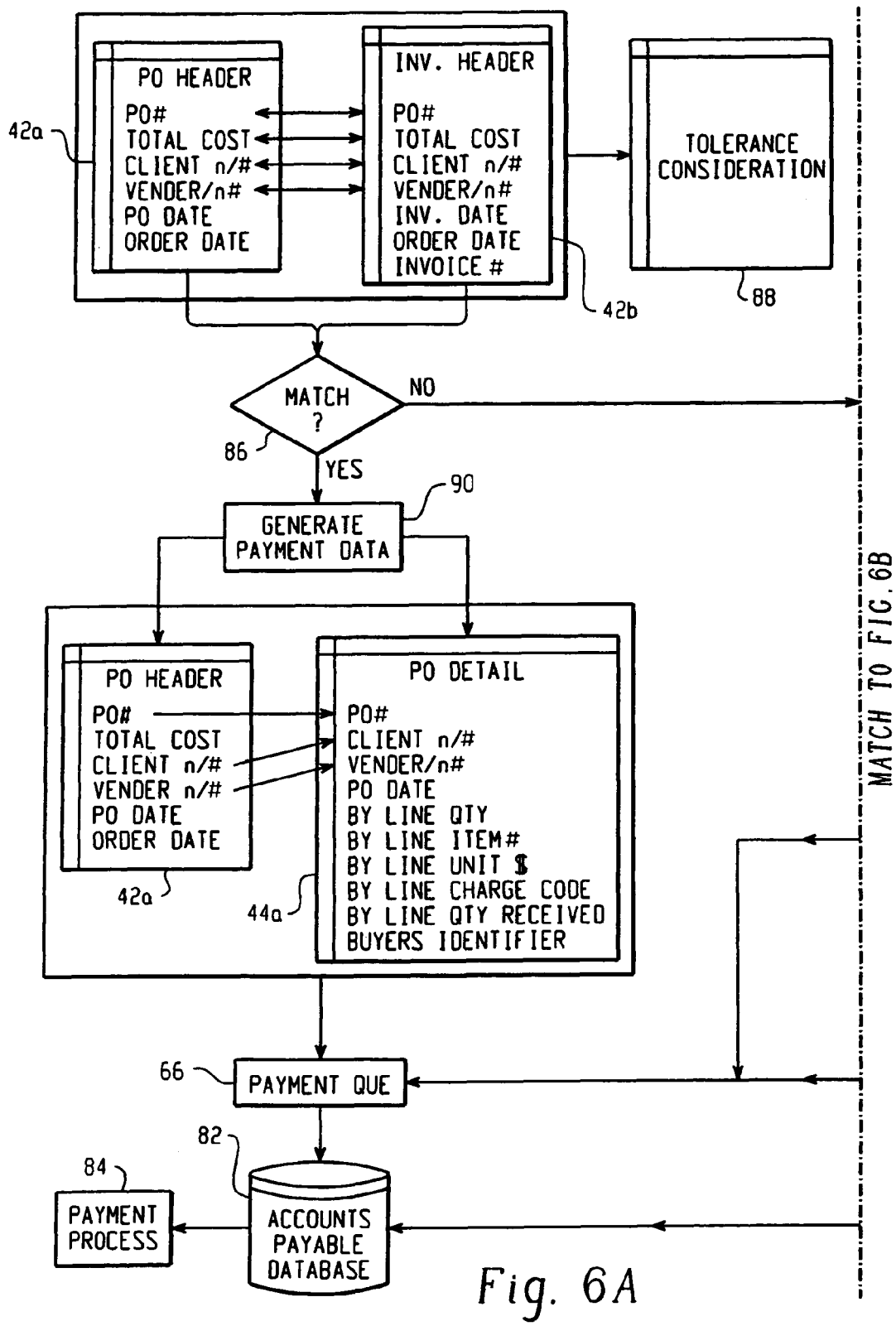
FIGS. 6A and 6B are schematic representations of an example matching logic process of the system of FIG. 2.
Figure 6B:
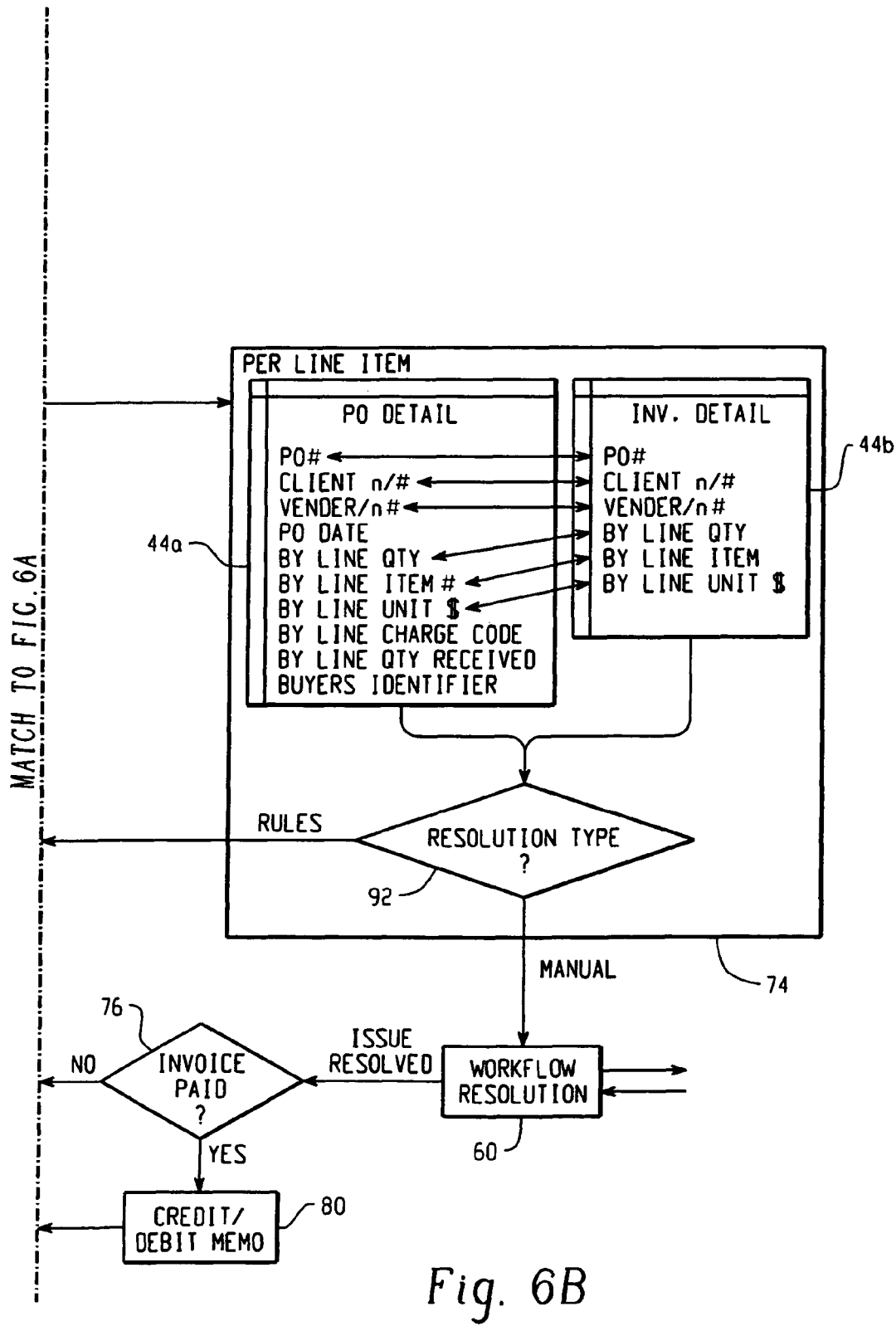

FIG. 6 is a schematic representation of an example matching logic process of the system of FIG. 2. Initially, the information from purchase order header table 42a and invoice header table 42b are compared to see if there is a high level match 86 between this information. Typically, the header information compared is the purchase invoice number, the total cost of goods received, the total cost of products shipped, the client number or other identification, and the vendor number or other identification.

When comparing the information from purchase order header table 42a and invoice header table 42b, the tolerances from tolerance consideration table 88 are to be factored in. The data in tolerance consideration table 88 is predetermined data and may be different depending upon the client or vendor. This data may be modified.

If there is a match of the header information within the tolerance, then payment data is generated in step 90. The payment data is generated by accessing or retrieving the purchase order detail table 44a information for the corresponding purchase order header table 42a information. Then this information is provided to the payment queue 66, the accounts payable database 82, and on to the payment process 84. Data may be provided to the balancing account 64, for example, if there are minor discrepancies between the total cost of goods received and the invoice total cost.

If the purchase order header table 42a information and the invoice header table 42b information do not match in the high level match 86 step, particularly relating to the comparison of the total cost of goods received and the invoice total cost, then the line item match step 74 occurs comparing the purchase order detail table 44a information with the invoice detail table 44b information. As illustrated, this information may include purchase order number, client number, vendor number, by line quantities (shipped and received), by line item numbers, and by line cost per unit.

Figure 7B:
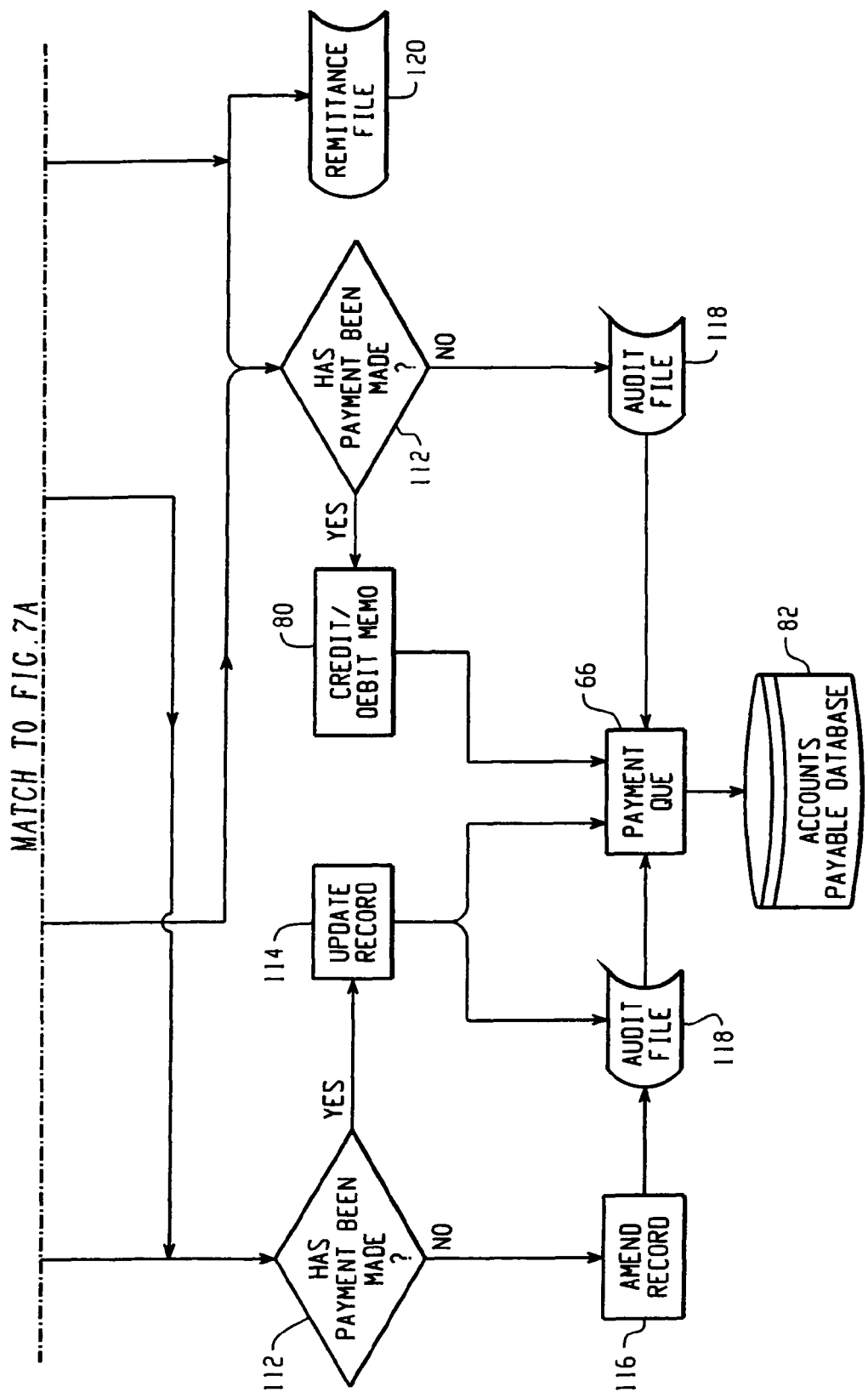

If individual line items match, or if a rules-based scheme is employed to resolve differences between line items, then resolution step 92 will provide the information to the payment queue 66. If there is no match and no rules-based scheme to resolve the discrepancies, then the matter is referred to the workflow resolution 60, as illustrated in FIG. 7. Once the issue is resolved, then a determination is made whether the invoice has been paid in step 76. If the invoice has not been paid, then the information is provided to the payment queue 66. If the invoice has been paid, then a credit or debit memo is generated in step 80 and provided to the accounts payable database 82.

FIG. 7 is a flow diagram of an example resolution process of the system of FIG. 2. This process is utilized to resolve any discrepancies identified during the previous processes. If there are issues from the charge code verification process illustrated in FIG. 4 that require administrative workflow resolution 60a or buyer workflow resolution 60b, collectively referred to as charge code issues 56, or if there are issues from the matching flow process illustrated in FIG. 5 and identified at step 73, then those issues are identified to the client by email notification 94, for example. The email notification 94 may include statistical information on the status of the charge code issues 56 or matching issues 73 and may identify the role 96 of the issues as either administrative issues 60a or buyer issues 60b. If the issue is an administrative issue, the email notification 94 may direct the client to the administrative homepage 98 on the World Wide Web 100, for example. Other networks, such as a Local Area Network (LAN) or a Wide Area Network (WAN), or any other computer network may be used to access the administrative homepage 98. Further, the administrative homepage 98 may be of any format suitable for performing the functions described herein.

Two of the screens available for access from the administrative homepage 98 are the administrative charge code resolution screen 102 and the administrative matching resolution screen 104. Through the administrative charge code resolution screen 102, any of the charge code issues 56 that have been identified may be resolved. Through the administrative matching resolution screen 104, any of the matching issues 73 may be resolved.

If the email notification 94 identifies that the issues to be resolved are associated with a particular buyer, then the email notification 94 may direct the client to a buyer homepage 106, accessible via the World Wide Web 100. As with the administrative homepage 98, the buyer homepage 106 may be accessed through any of a variety of computer networks. Two of the screens available from buyer homepage 106 include the buyer charge code resolution screen 108 and the buyer matching resolution screen 110. Through the buyer charge code resolution screen 108, charge code issues 56 associated with that buyer may be resolved. Likewise, through the buyer matching resolution screen 110, matching issues 73 associated with that buyer may be resolved. There may be many different buyer homepages 106, depending upon the number of buyers associated with that particular client. Each of the buyer charge code resolution screens 108 and buyer matching resolution screens 110 may also be accessed from the administrative homepage 98 for that client, if such authorization is desired by the client.

Once the charge code issues 56 have been resolved through either the administrative charge code resolution screen 102 or the buyer charge code resolution screen 108, the next step, identified as 112 on FIG. 7, is to determine if payment has been made for the particular item for which there was a charge code issue 56. If payment has been made, then the records associated with the charge code issue are updated in step 114. If the payment has not been made, however, then the records associated with the charge code issue 56 are amended and the proper detail table 42, 44 is amended in step 116. After the records have been updated or amended, the data is provided to an audit file 118 to document the update of the codes in the records. The information is then passed to the payment queue 66 and subsequently to the accounts payable database 82.

Once the matching issues 73 have been resolved via the administrative matching resolution screen 104 or the buyer matching resolution screen 110, then the next step is to determine whether payment has been made in step 112. Concurrently, remittance file 120 is updated with information such as the buyer who resolved the issue, the date, the changes that have been made, etc. If payment has been made, then a credit/debit memo 80 is generated and forwarded to the payment queue 66 that then loads the information to the accounts payable database 82. If payment has not been made, then the audit file 118 is updated documenting the changes and updates that have been made. The record is then forwarded to the payment queue 66 and on to the accounts payable database 82.

The system and method of the present invention may also provide for tracking of the history of the workflow resolution process, including who accessed or participated in the resolution, the dates and times such access occurred, and the messages exchanged or provided to the system. This may be advantageous in the event that disagreements arise over the resolution, future similar discrepancies are identified, or the individuals involved need to be contacted. This information may be tracked in the statistics area 70, by a separate database, by the web site software associated with the administrative homepage 98, the buyer homepages 106, or the supplier homepage 144, or may be tracked in any other suitable manner.

Figure 8:
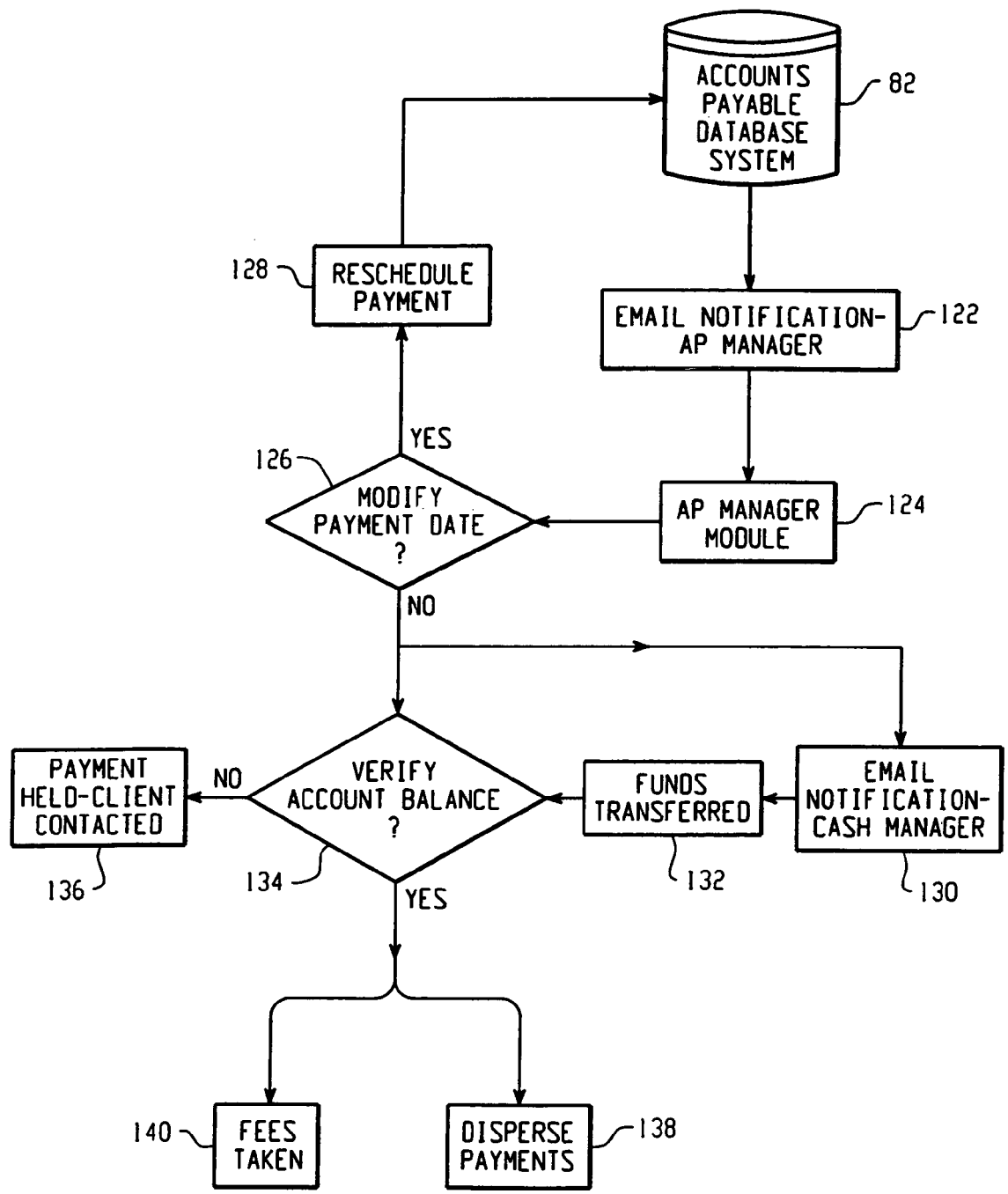
FIG. 8 is a flow diagram of an example cash management process of the system of FIG. 2.

FIG. 8 is a flow diagram of an example cash management process of the system of FIG. 2. At a predetermined time, for example, two days prior to payment of an invoice, or part thereof, corresponding to a record in the accounts payable database system 82, an appropriate notification is provided to the client alerting the client that the payment is due. Such a notification may be via e-mail as in step 122, and may be to the accounts payable manager of the client. The primary purpose of the notification is to alert that a payment is due within the predetermined amount of time.

The accounts payable manager can then access the system, such as through the World Wide Web 100, and access the accounts payable manager module or homepage 124. Within the accounts payable manager module or homepage 124, the manager would be able to look at the individual records for which notification has been sent and decide whether the payment date in the records should be modified, as identified in step 126. If the payment date is to be modified, then the payment is rescheduled in step 128 and the item returned to the accounts payable database system 82.

If the payment date is not to be modified, then a notification is sent to the manager of the cash that will be made available for payment. This may take the form of an e-mail notification, as noted in step 130. The notification will request transfer of full funds necessary for the particular payment. The funds are then transferred in step 132 to an account from which the payment will be made. Then a check in step 134 will be made to verify that sufficient funds are available in the account to make the appropriate payments. If there are not appropriate funds in the account, then payment is not made and the client is contacted in step 136 to resolve the discrepancy. If there are sufficient funds, then payments are disbursed in step 138 and any appropriate fee is also withheld in step 140.

Figure 9:
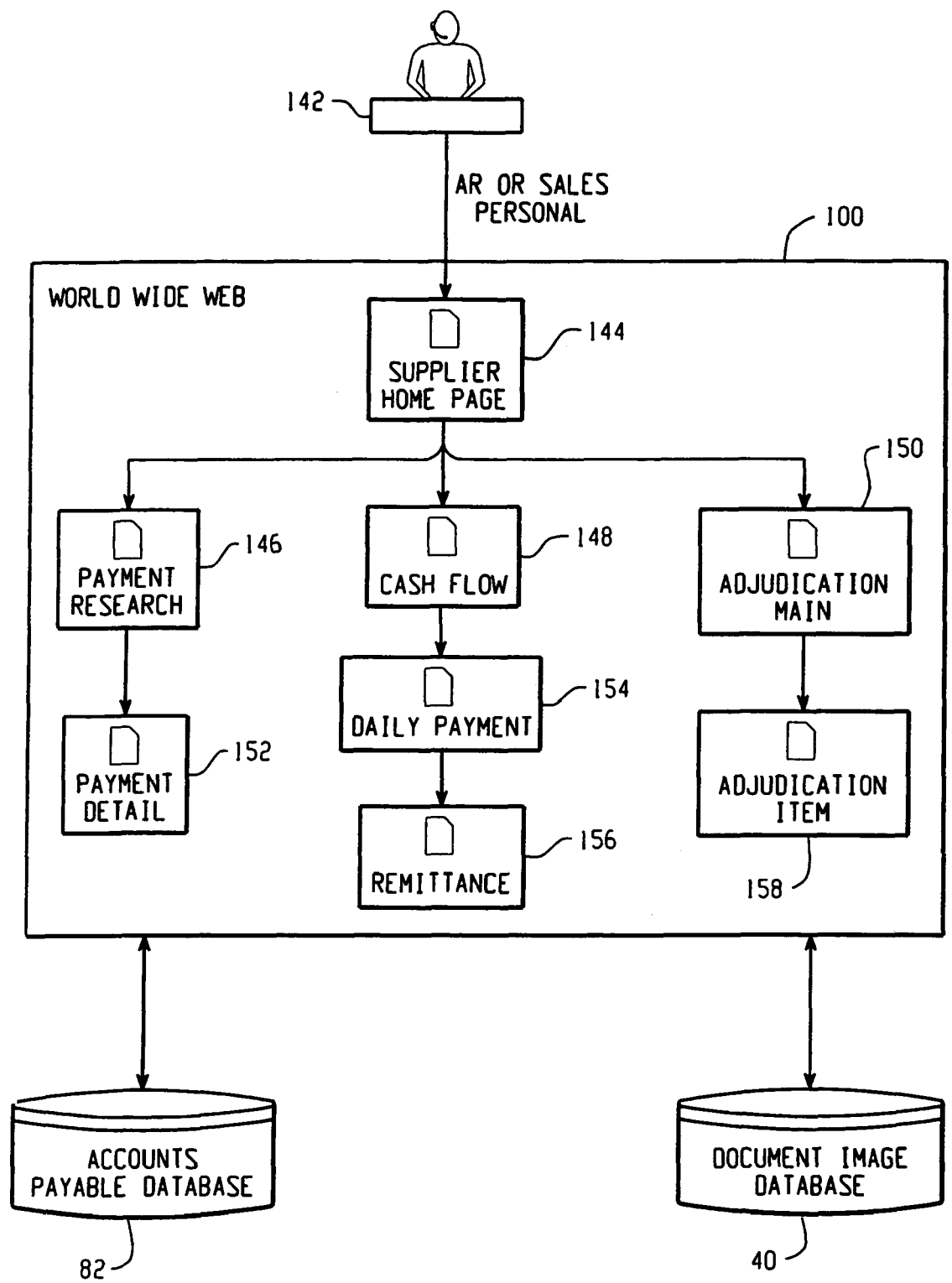
FIG. 9 is a schematic representation of an example supplier access process of the system of FIG. 2.

FIG. 9 is a schematic representation of an example supplier access process of the system of FIG. 2. The accounts receivable or sales personnel 142 from the supplier will access the interactive platform through a supplier homepage 144. In a preferred embodiment, the access will be via the World Wide Web 100, but any suitable network may be used for access, including LAN, WAN, or other networks. From the supplier homepage 144, the supplier personnel may access information regarding payment research 146, cash flow 148, or adjudication 150.

From the payment research access 146, the personnel 142 may enter a search term, such as a purchase order number or invoice number, to identify a record corresponding to the particular data input. From there they may see payment detail information, including whether payment has been authorized, when payment was sent, etc. This is illustrated on FIG. 9 by step 152.

From the cash flow access 148, the personnel 142 may see what daily payments 154 have been made or are to be made to the supplier and may see further remittance information 156 regarding the cash flow to the supplier.

From the adjudication access 150, the supplier personnel 142 may see all of the adjudication items 158 relating to that supplier, including the particular issue and the detailed information for both the purchase order side and the invoice side. The supplier personnel 142 may have the ability to resolve the issue, but the ability is preferably limited to choosing only a lower quantity or a lower price for the item in adjudication. For example, if the reason for an item being in adjudication is because the line item unit price has a discrepancy of five cents per item, the supplier may elect to not hold up the payment merely because of such a minor discrepancy. A higher quantity or a higher price may not be chosen by the supplier at this point. If the item is adjudicated by the supplier through the adjudication access 150, then this is removed from the client resolution workflow illustrated in FIG. 7, and immediately sent to the payment queue 66 for payment.

From the supplier homepage 144, the information supplied comes from the accounts payable database 82 and/or the document image database 40. At any time, the supplier personnel 142 may review the image of the invoice or of any receiving documents that have been entered into the document image database 40. The supplier access and supplier homepage 144 may be of any format and is customizable to meet the needs of the supplier.

Figure 10:
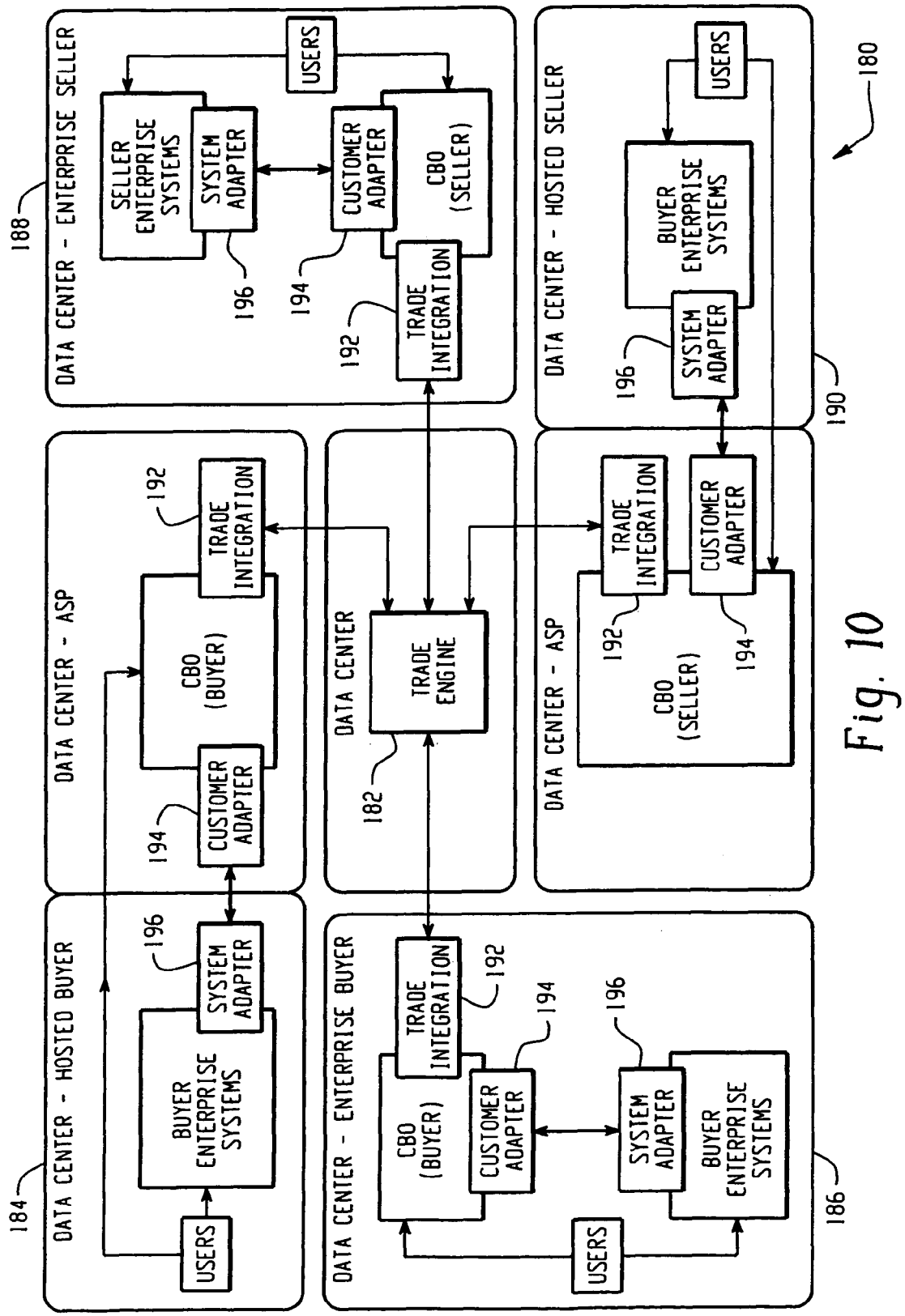
FIG. 10 is a block diagram of an example distributed transaction management system.

FIG. 10 is a block diagram of an example distributed transaction management system 180. The system 180 is distributed in the sense that the system software components are not located in one system, but instead are distributed among a variety of systems. Preferably, the system includes a central data center trading engine 182, or hub, and a plurality of trading modules and adapters that link a plurality of customer sites (spokes) 184, 186, 188, 190 to the central data center trading engine 182. Two different types of customer installations are shown in FIG. 10, an enterprise installation and a hosted installation. In the enterprise installation, such as the enterprise buyer installation 186 or the enterprise seller installation 188, the system's collaborative back office (CBO) software (described in more detail below) is located at the same location as the buyer (or seller's) enterprise system. In the hosted installation, such as the buyer hosted installation 184 or the seller hosted installation 190, the CBO software is hosted by an application service provider, for example, and is located at a different location from the buyer (or seller's) enterprise system. In the enterprise model, the CBO software (and all other modules and adapters) are located behind the corporate firewall that controls network connectivity between the enterprise system and the data center 182. By distinction, in the hosted installation, the CBO software and several other modules are not located behind the corporate firewall. Regardless of the installation approach, the central data center 182 is preferably coupled to the buyer and seller systems via a wide area network, such as the Internet. Other network connections are also possible, such as virtual private networks, etc.

The trading modules and adapters include a trade integration module 192, a customer adapter module 174 and a system adapter module 196 located at each customer site. In the enterprise installation, 184, 188, all of these modules are located at the same location as the CBO software and the buyer (or seller) enterprise systems. In the hosted installation, the trade integration module 192 and the customer adapter 194 are located at an ASP site, and the system adapter 196 is located at the site of the customer's enterprise system.

The collaborative back office (CBO) software is provided in both a buyer version and a seller version. Certain functionality provided by the buyer system is preferably not provided in the seller system, although in alternative embodiments these software systems could be identical. For the buyer CBO software, the following functions are preferably provided: sorting and matching trade data; automatic and manual matching of trade data; data reconciliation; online collaboration with supplier(s) to speed up dispute resolution, data viewing and editing; etc. These functions are further described below with reference to FIGS. 11-22, which describe an exemplary process for automated and manual matching and reconciliation of trade data and a corresponding interface for use by both buyers and sellers for viewing, resolving and collaborating on trade matters.

The seller CBO software module (as shown in 188 and 190) provides a different set of features from the buyer CBO software module. Preferably, these features include: reviewing invoice status (online) prior to payment; viewing detailed deduction notification data from a buyer system; reconciliation of invoice deductions; tools for building deduction dispute forms; etc.

The CBO systems at each buyer and seller site interface with the buyer (seller) enterprise system (via the customer adapter 194 and the system adapter 196) and the central trade engine 182 via the trade integration module 192. The central trade engine 182 provides message validation between the systems, data conversion, routing, and reporting functions between the various trading partners. Although just two buyer systems 184, 186 and two seller systems 188, 190 are shown in FIG. 10, the system 180 is scalable to include any number of buyers and sellers, all trading data and resolving financial matters though the CBO systems and the central trade engine 182.

The trade integration module 192 links the central data center 182 to the various CBO systems at the buyer and seller sites. It essentially pulls data from the CBO system and provides data conversion and protocol layers to communicate the data to the central trade engine 182 and then onto the appropriate trading partners. The customer adapter module 194 is a piece of customer-specific code that links the CBO system (which is generic to all sellers or buyers) to a customer specific enterprise system through the system adapter 196. It also provides customer-specific alterations and/or customization of the CBO system, such as specific business rules, workflow or validation procedures that may be unique to the particular customer. The system adapter 196 links to the customer's enterprise system and provides data conversion from the enterprise system format to the format expected by the CBO system, which is preferably in XML format.

Because the systems shown in FIG. 10 may be connected via public networks, such as the Internet, system security is an important consideration. In addition to firewall protection, it is preferably that data exchanges in this system are done using public/private key encryption techniques, and also using secure HTTPS/SFTP connections for web-related transmissions and file transfer between servers. For example, when transferring a batch of transaction data from an enterprise server to the CBO software system, a public/private key approach is preferred. User authentication is also provided for each user of the system to prevent unauthorized access to the system and/or the underlying transaction data. This user authentication is built upon a permissions-based model that allows permissions, roles and groups to be defined and configured on a per-customer basis, so that only certain data is visible to certain authenticated users.

Figure 11:
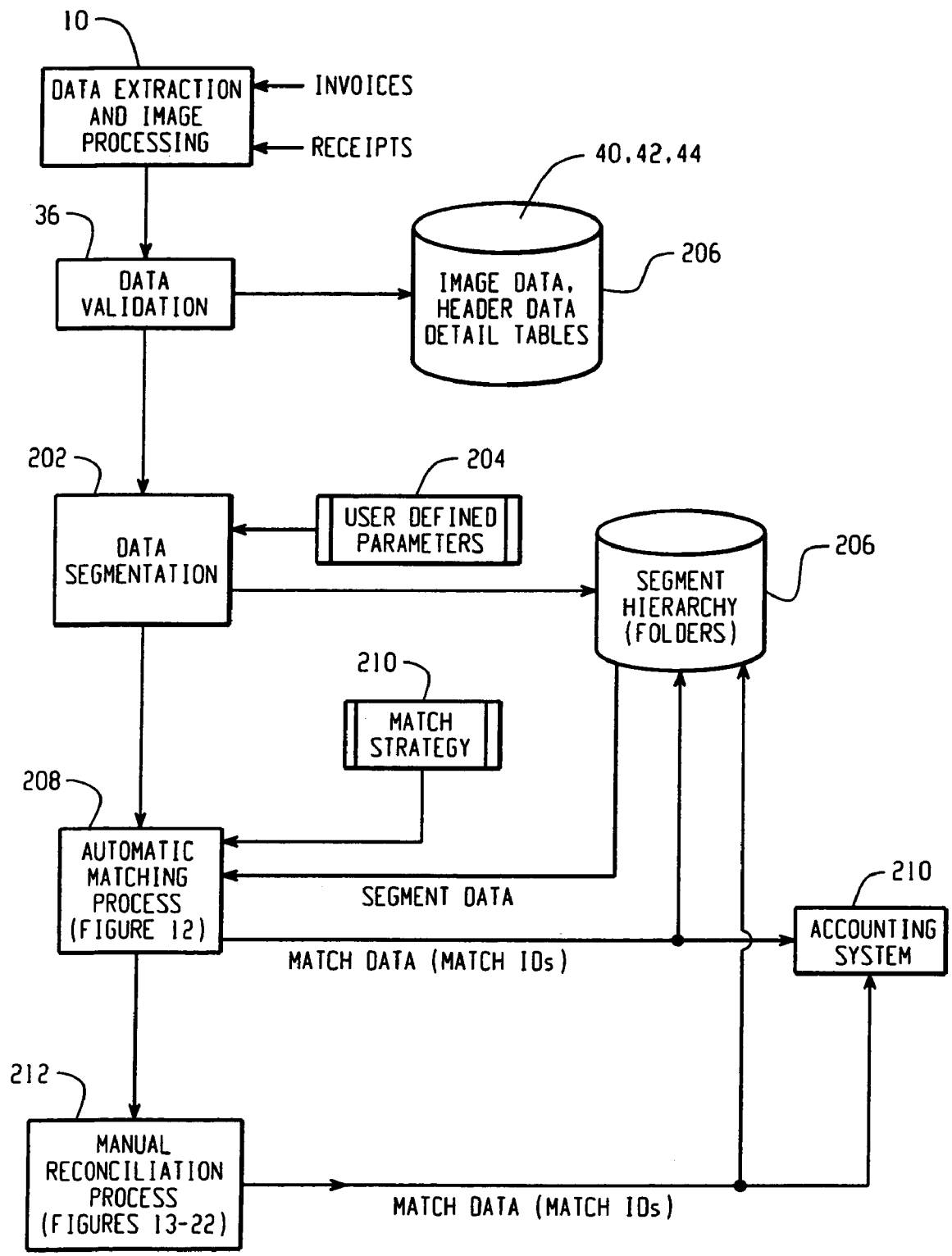
FIG. 11 is a flow diagram of an example transaction matching process in which invoices and receipts are segmented into a hierarchy of pools prior to automated and manual matching.

FIG. 11 is a flow diagram of an example transaction matching process in which invoices and receipts are segmented into a hierarchy of pools prior to automated and manual matching. This transaction matching process is one function of the CBO software systems shown in FIG. 10, preferably implemented at the buyer CBO systems, but alternatively implemented at both the buyer and seller installations.

The process begins at step 10, in which purchase order and receipt data as well as invoice data is extracted and image processed, as described above with reference to FIG. 3. The extracted data is validated in step 36, similar to that described above, and then stored into the system as image data, header data and detail tables 40, 42, 44. This data can be stored at the buyer and/or seller systems 184, 186, 188, 190, or it can be centrally archived at the data center 182 where the trade engine is located. Alternatively, the data can be mirrored at a variety of different locations to enable both local and remote processing. Additional processes, such as those depicted in FIG. 4, above, may also occur at this stage of the process.

Following data extraction, validation and storage, the data is fed into a processing queue (including stages 202, 208, 212), in which the data is sorting into logical groupings (also referred to herein as segments or pools) for automated and manual matching processes. In this segmentation step 202, user defined parameters 204 are used to determine the appropriate type of segmentation (or pooling) to perform on the extracted invoice/receipt data. These user defined parameters identify specific characteristics of the invoices and receipts and sort them using these characteristics. Different pooling characteristics may include: by vendor; by different combinations of a company's user identification number, by a unique identification assigned by the customer's accounting department, by a specific purchase order, by the location where the goods were received, by department, etc. Moreover, the segmentation may be accomplished in a primary, secondary, and n-ary manner so as to develop a hierarchy of segmentation, such as initial by vendor, but then within the vendor pool, by department of the vendor, and then within the department of the vendor by location, etc., so as to develop a tree-like hierarchy of segments to be searched by the automated and manual matching processes 208, 212 of the processing queue.

Using these hierarchical segmentations 206, the system is able to break down the matching process into smaller segments of data to be matched. This segment data is then provided to the automatic matching process 208 (FIG. 12), which applies a match strategy 210 comprising a plurality of matching rules in an attempt to automatically match the invoices/receipts in a given segment of data. If a match is determined within the segment, then a unique match identification (Match ID) is associated with the matched documents, and this data is then stored in the system 206 and provided to the accounting system for payments, deductions, charge back, etc. If the data within a certain segment fails to provide a match, then alternatively a different (perhaps higher level) segment can be searched for the appropriate matching data, or the data may be provided to the manual reconciliation process 212 (as further described below in FIG. 13-22.) By initially segmenting the data 206 into these hierarchical segments (or pools), the efficiency and accuracy of the matching process is increased.

Figure 12:
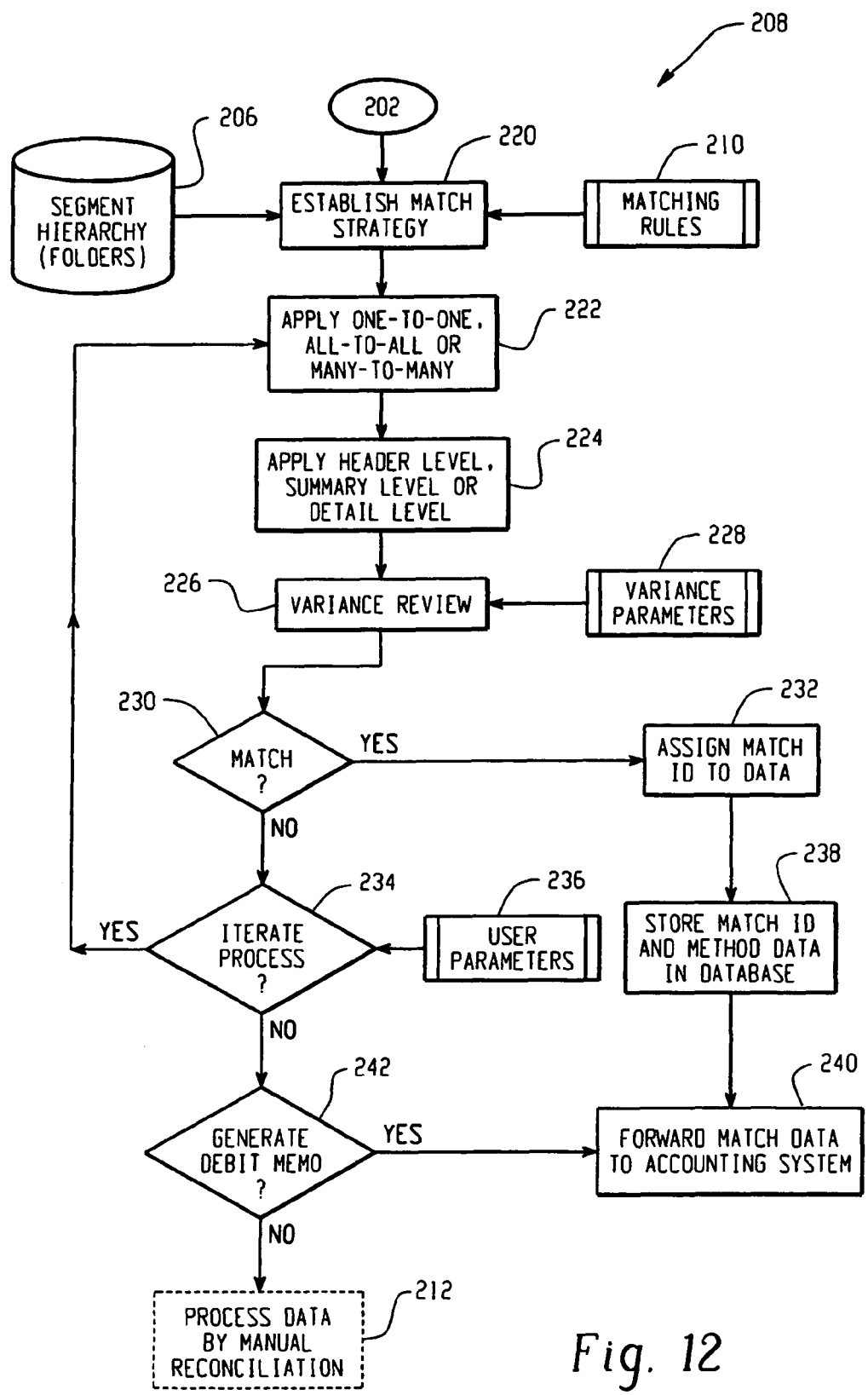
FIG. 12 is a flow diagram of an example automated matching process providing N-dimensional matching of invoices and receipts.

FIG. 12 is a flow diagram of an example automated matching process 208 providing N-dimensional matching of invoices and receipt data. Unique to this process is the system's ability to iteratively compare transactions within a given segment of data using a set of user-defined matching rules 210, which together provide a match strategy that can be customized for each buyer/seller installation. These matching rules are applied to the match data on a priority basis until a match is detected, or if no match is detected then the system can either automatically generate a debit memo 242 or proceed to the manual reconciliation process 212.

The process begins at step 220, where the match strategy is established using stored matching rules 210 that are unique to the customer. The match strategy is then applied to the segmented (pooled) transaction data in order to automatically match invoices to receipt data. As noted above, the match strategy is typically composed of a plurality of matching rules 210. For example, the match strategy may comprise three rules, a first rule to match one invoice to one receipt with no tolerance allowed (in other words a perfect match), a second rule to match one invoice to one receipt if the invoice is within 10 days of the due date with a $50 tolerance, and a third rule to match one invoice to one receipt and to pay the invoice if it is over $50. These three rules then comprise the example match strategy, and are applied in steps 222, 224, 226, 230 and 234 to the segmented data 206.

In step 222, the system uses the matching rules 210 to determine how invoices and receipts should be matched, such as one-to-one, all-to-all or many-to many, or any combination thereof. This type-of-match determination is typically based upon past historical data and can be updated as match results are analyzed by the system. Following this step, the process then applies a match level to the segmented data at step 224. The match level determination can be done at the header level, the summary level or at the detail level. In the header level match, the system can make a determination (based on the header level data) to pay a particular invoice or deduct the difference in a lump sum. At the summary level, the system compares a summary invoice information and receipt information and compute either a charge back or a line level deduction. And at the detail level, the system matches individual lines of the invoice/receipt.

Following the match level determination, the system then applies a variance review process 226 using variance parameters 228. The variance parameters are defined as amount over/under, percent over/under, or a combination of the two. These parameters are then applied to the data output from the preliminary matching steps 222, 224 based on the matching rules to determine if the matching data is within a particular tolerance level as defined by the variance parameters 288. Acceptance of the preliminary match occurs if it is within the variance parameter.

Within the variance review process 226, the system may perform a best invoice match and/or a best pool match. The best invoice match directs the system to take the first invoice in the match pool and match it to the receipt with the smallest variance within the given tolerance. The best pool match directs the system to calculate all possible matches for the pool based on match level (for example, 1-1, or A-A) and match them based on the smallest variance within the given tolerance.

If the matching rules and variance steps 222, 224, 226 determine that there is a match, then at step 230, the process proceeds to step 232 and a unique match identifier (Match ID) is assigned to the match data. In this step (232), the Match ID is associated with all of the documents that related to the particular match, such as the invoice and receipt documents, and also the purchase order documents. If the resulting match generates a debit memo, then the same identification number is assigned to that debit memo. This Match ID is then used to subsequently view and understand how the match occurred, from either the buyer or seller's system, and may be used to tag additional documents that relate to the transaction. The associated match data (along with the Match ID) is then stored to the system database in step 238, and the match data is forwarded to the customer's accounting system for appropriate payment, etc.

If the matching rules and variance steps 222, 224, 226 determine that there is not a match, however, then at step 230, the process proceeds to step 234, where a determination is made as to whether further iterations of the matching rules (and/or variance calculations) should occur. If the system determines that additional dimensions of matching are available, then control passes back to step 222 and the next dimension (or level) of matching from the matching rules 210 is applied to the remaining data within the analyzed segment. This process continues until a maximum iteration is achieved, which may be controlled by a user parameter 236, at which point control passes to steps 242. At step 242 the system may either generate a debit memo for the unmatched (or un-reconciled) data or it may pass the data to the manual reconciliation process 212.

Figure 13:
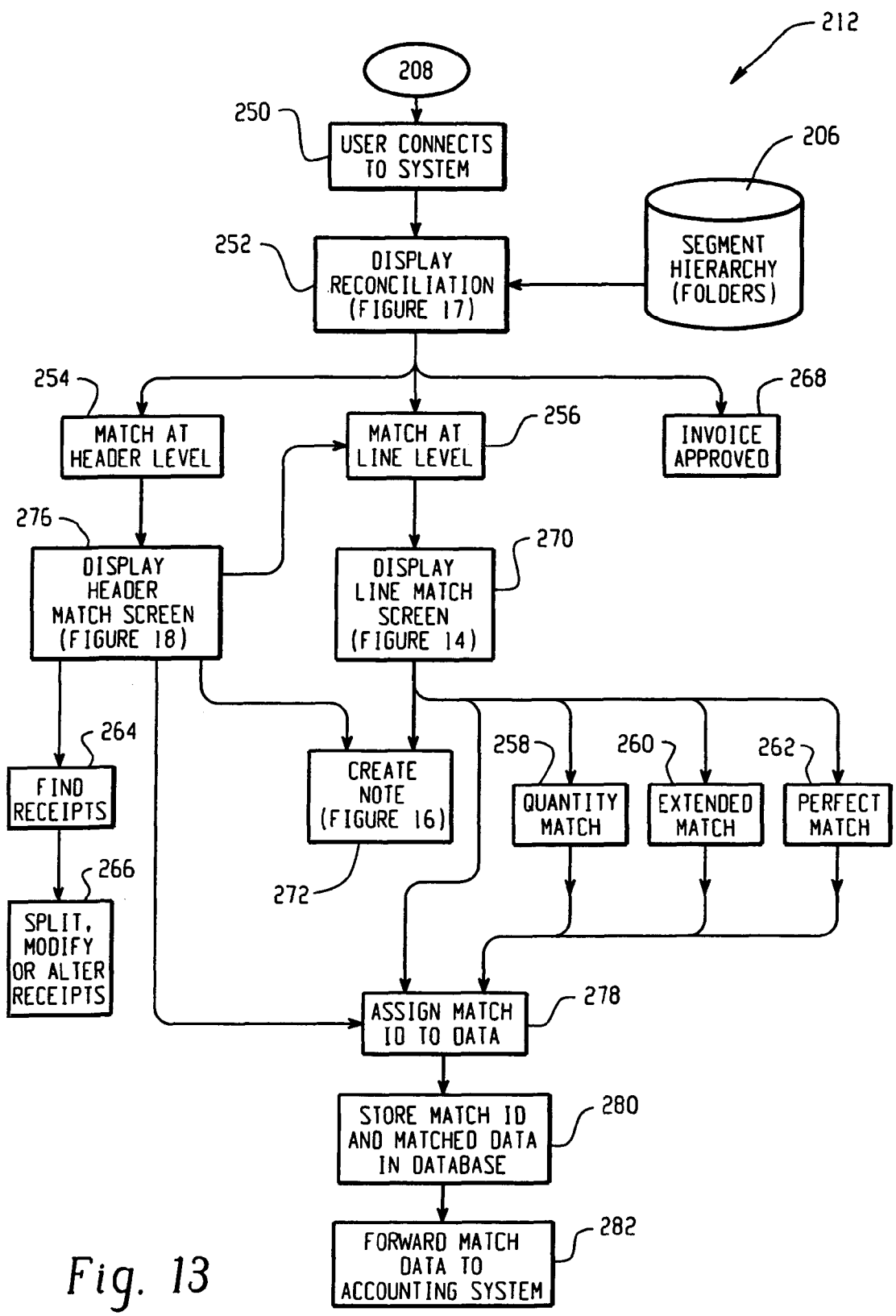
FIG. 13 is a flow diagram of an example manual reconciliation process providing numerous matching tools for matching invoices and receipts.

FIG. 13 is a flow diagram of an example manual reconciliation process 212 providing numerous matching tools for matching invoices and receipts. This process is typically applied to the segmented data that has not been matched via the N-dimensional automated matching process described in FIG. 12.

The manual reconciliation process begins at step 250 when a user (either buyer or seller) connects to the system. This connection can occur through a secure web page interface, or through other types of secure connections. Once connected to the system, the user launches 252 the reconciliation queue screen, as further described below in connection with FIG.

17. The reconciliation screen is the beginning point for manually reconciling invoices and receipts that failed to be automatically matched in the N-dimensional process of FIG. 12. The segmented transaction data 206 is passed to the reconciliation queue screen display 252 and provided to the user for manual reconciliation.

From the reconciliation screen (FIG. 17), several options are available to the user for manually reconciling the transaction data, including matching invoices and receipts at the header level 254, matching invoices and receipts at the line level 256, and invoice approval 268.

Manual matching of invoices to receipts can be selected either at the header level 254 or the line level 256. When matching at the header level, the header match screen will display unapplied and applied invoices on the left side of the screen (See, FIG. 18), and unapplied and applied receipts on the right side of the screen. Receipts can then be selected or unselected with a simple button click.

Figure 14:
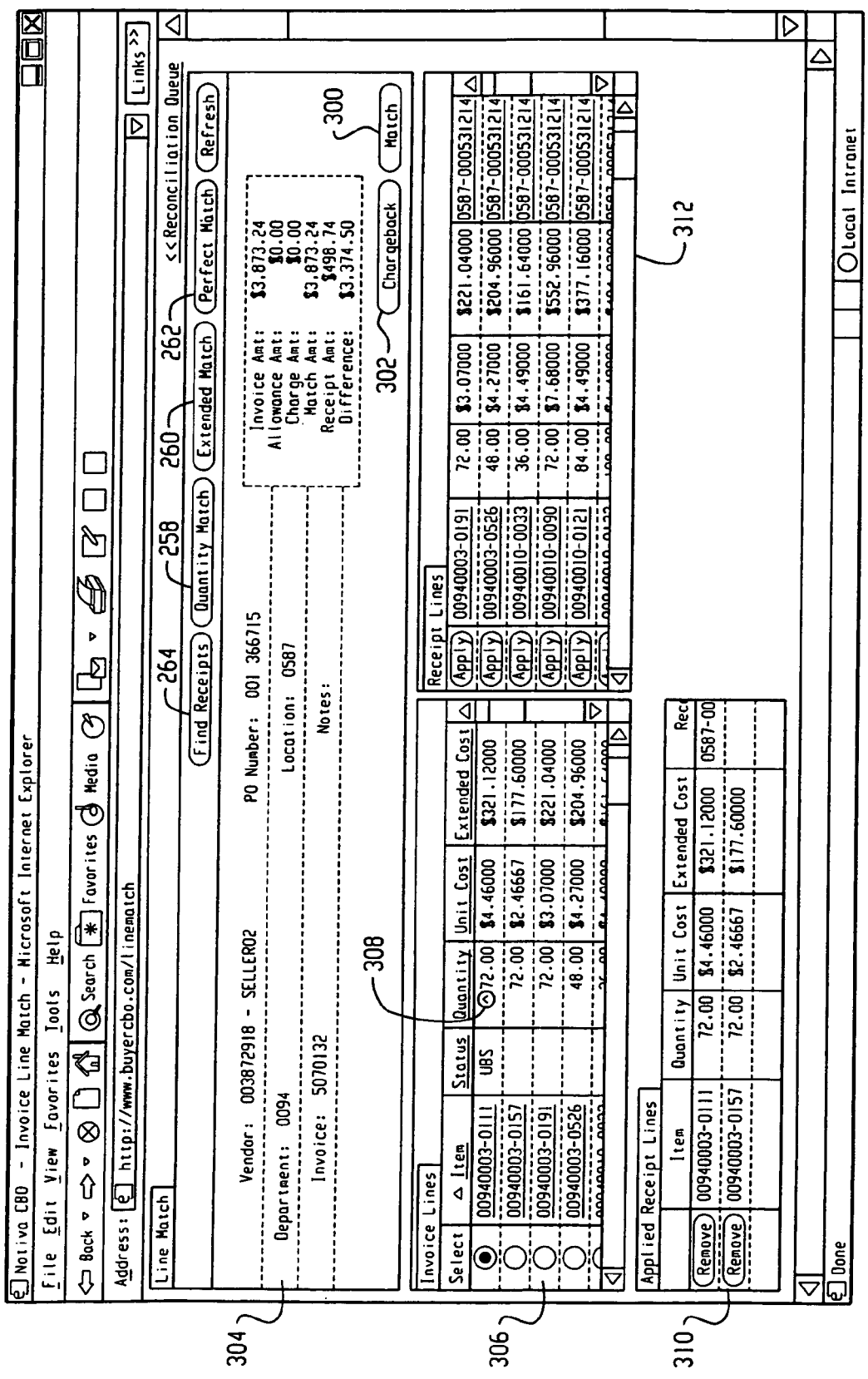
FIG. 14 is a line match screen interface operable by a user of the system in order to manually reconcile invoices and receipts at the line level.

When matching at the line level 256, the same side-by-side displays are presented to the user, but the data is presented at the line level, as shown in FIG. 14 for the line match screen 270. From this screen, the user then selects the invoice line and applies the appropriate receipt lines. Following manual matching at the line or header level 270, 276, the system then assigns the unique Match ID to the transaction documents 278, stores the data (with the Match IDs tagged thereto) in the system database 280, and then forwards the match data to the buyer/seller accounting system 282.

Semi-automated matching is provided through the quantity match 258, extended match 260 and perfect match 262 functions accessible through the line match screen (FIG. 14). The quantity match function 258 will apply all the receipt lines that have the same item and quantity, which enables the system to automatically match items on the invoice and receipt that have different unit costs. The extended match function 260 determines matching invoice and receipt lines where the item and the extended costs are the same. This enables the system to handle invoice and receipts that have different case packs (e.g., the invoice may identify items individually but the receipt may identify items by a box of six or eight items). In this situation, the item count is the same but the cost may be different because there may be different quantities in the case pack, however the extended match will be the same. Thus, the extended match enables the user to match items that have different case packs. The perfect match function 262 will match invoice and receipt lines where the item number, unit price and extended costs are all the same. Another feature that is accessible to the user is an item match process, which allows the user to match only on the item number. This process enables matching of items that have the same item number but different quantities and unit prices.

Regardless of which tool is selected 258, 260, 262, the system will then assign a unique Match ID to the transaction documents 278, store the documents with the tagged ID value back into the system database 280, and then forward the match data to the buyer/seller accounting system 282.

When any of the manual (or semi-automated) matching processes are utilized, the system may display resulting matched lines with indicators describing the quality of the match. (See, FIGS. 14, 15) Different status identifiers may include: Perfect Match (PM); Overbilled (OB); Underbilled (UB) Substituted Item (SUB); or a combination of these identifiers, for example and underbilled substitution would have the status UBS as shown in the first invoice line item of FIG. 14. In addition, icons are displayed next to particular line item quantities to indicate how the invoice line compares to the matched receipt line. The displayed icons include "^" for over received, "v" for under received and "=" for receipt quantity equal to invoice quantity. These indicators and status identifiers provide additional graphical detail to the user to facilitate proper item reconciliation.

If the user has exhausted all of the manual and semi-automated matching functions, and the match still exceeds user tolerance (variance) levels, then the user can create a memo to the seller to help facilitate some other reconciliation process, and this memo is then stored into the system database where the seller user can access it for manual reconciliation or negotiation with the buyer user.

If the user selects the find receipts option 264, the system provides an ability to find particular receipts that may not be displayed on the header or line match screens because the receipt is either in another data segment, or did not pass one of the matching rules of the match strategy. In step 264, the user accesses a receipts screen interface. From here, the system provides filtering and sorting options to enable faster searching for a particular receipt. Once the receipt is found, then at step 266 the user can choose from several options, such as adding the receipt to the view match screen, altering or modifying the selected receipt, or splitting the receipt at the line level to create several line level receipts or line level grouping of receipts. By splitting the receipt at the line level, the system enables the user to match the same receipt to multiple invoices. This function can also be accomplished from the line match screen 256.

Most of the functionality described with reference to FIGS. 11-22 deals with the buyer-side reconciliation process accessed through the buyer COB application. Within the seller COB application, the reconciliation screens are similar to that described and shown for the buyer, in which the seller user can view buyer applied matches, adjustments and any subsequent memos created by the buyer user. For example, the seller users can view how the buyer user matched the transaction documents, and may then reconcile these matched documents to determine if the seller is in agreement with the buyer's match.

Another function available to the user is to convert the units of measure shown on the seller invoice to the buyer's preferred units of measure. This function can ease the matching process where the buyer and seller units of measure are different. Using this function, the user can convert the invoice, invoice lines, receipt, or receipt lines in order to facilitate the manual or semi-automated matching functions.

FIG. 14 is a line match screen interface 252 operable by a user of the system in order to manually reconcile invoices and receipts at the line level. The manual matching provided through the line match screen 252 incorporates a "side-by-side" presentation style for displaying the segmented invoices and receipts that did not pass the automated matching process. Preferably, however, these invoices are for those receipts that met at least one of the matching rules (but not necessarily within the programmed variance) defined in the match strategy.

At the top of the interface is the line match display portion 304, which displays a selected invoice by vendor, department number, invoice number, purchase order number, and location. In addition, this display portion 304 of the interface provides financial data on the invoice amount, allowance amount, charge amount, matching amount, receipt amount and any difference. Within the line match display portion 304, the user can select from one of the semi-automated match functions, such as the quantity match function 258, the extended match function 260 or the perfect match function 262. In addition, the user can find a particular receipt 264, generate a charge back item 302, or perform a matching function 300 based on manually selected invoices/receipt, or lines of selected invoices/receipts.

Below the line match display portion 304 is the side-by-side invoice/receipt display portions 306, 312. In the invoice display portion 306, individual invoices lines are displayed in sequential fashion. The invoices lines displayed include item number, status, quantity, unit cost and extended cost. The status field is described above with reference to FIG. 13. The quantity field includes the graphical icon indicators 308 described above. A radio button at the front of the invoice lines is used to select a particular invoice line for application to a particular receipt line, either using one of the semi-automated functions 258, 260, 262, or by manual application to a particular receipt. The receipt lines are displayed in the receipt display portion 312, and include similar information to the invoice lines. An "apply" button is positioned next to each invoice line so that after a user manually selects a particular invoice line, the user can manually select a particular receipt line in order to perform the line level manual matching process 256.

Below the side-by-side invoice/receipt display portions is the applied receipt line display 310. This portion of the interface 252 shows receipt lines that have already been applied to a particular invoice line and provides the user with the ability to remove the application of a particular receipt line so that it is displayed in the side-by-side receipt line display area 312.

Figure 15A:
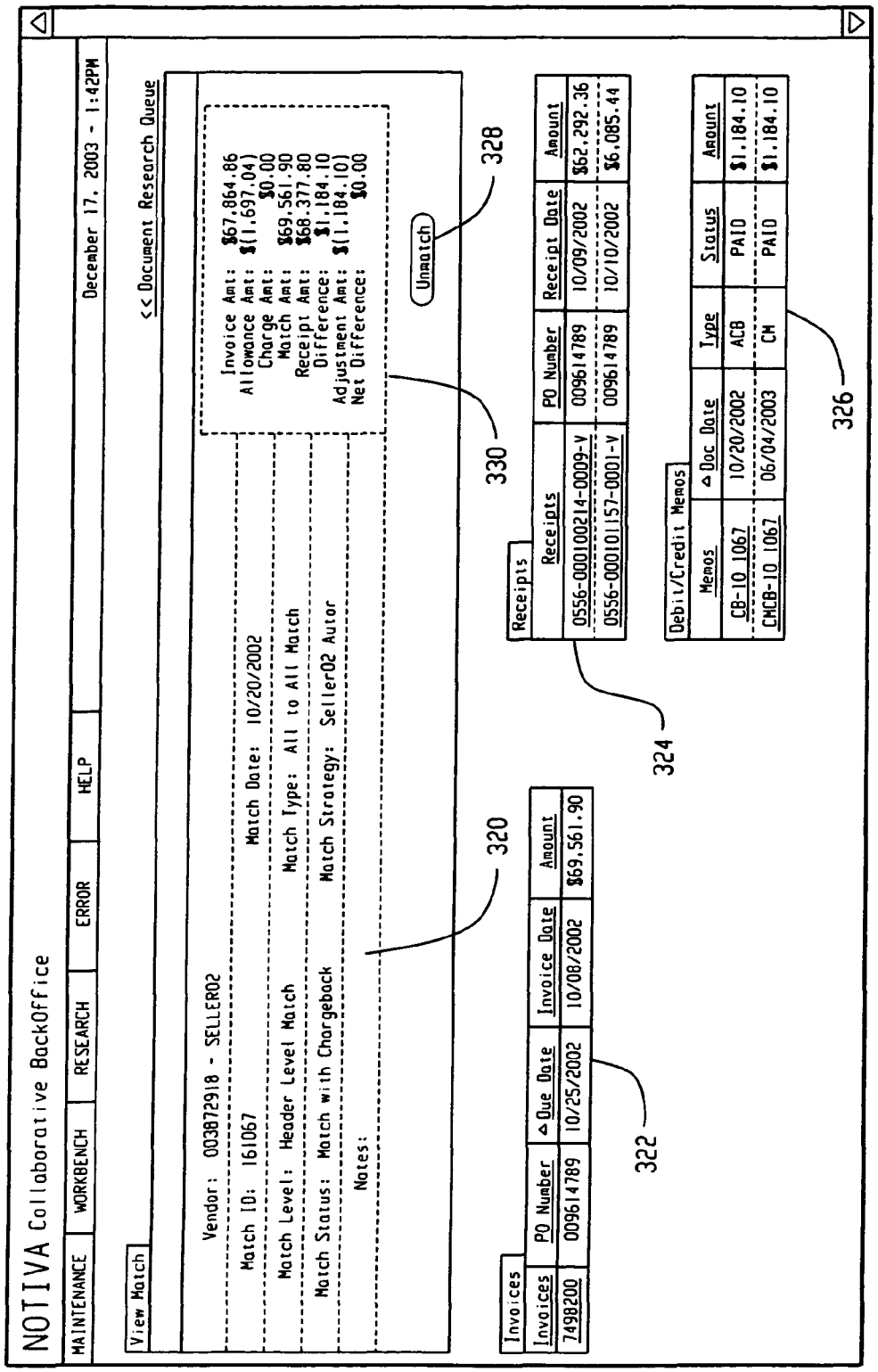
FIG. 15A is a view match screen interface operable by a user of the system in order to view the details of a matching process executed by the system.

FIG. 15A is a view match screen interface operable by a user of the system in order to view the details of a matching process executed by the system. Along the top of the interface screen 274 is the match summary portion 320, which provides the details of the invoice to receipt match performed by the system or manually by the user. Within the match summary portion 320 of the interface the following data is displayed: vendor, unique Match ID, match level, match status, match date, match type and the match strategy utilized in performing the match. Also within the match summary portion 320 is a financial block 330 showing the invoice amount, allowance amount, charge amount, match amount, receipt amount, difference between the match amount and the receipt amount, an adjustment amount and a net difference. An un-match button 328 can be executed to un-do the matching performed by the system if the user determines that there has been an error in the matching process.

Below the match summary portion 320 are three sub-displays showing the details of the matched invoices 322, the matched receipts 324 and any debit/credit memos that were generated 326. All of these documents are tagged with the Match ID for this match transaction and stored in the system database with this tag. As can be seen in these displays, a single invoice in the amount of $69,561.90 has been matched to two receipts and a credit memo has been generated for the difference amount. From the view match screen, the user can return to the documents research queue, as further described below in FIG. 19.

The screen shows all the information for this transaction, starting with all the invoices involved for this one particular match, all the receipt of goods included (and this could be a one to one, one to many, many to one, many to many). As an example, this may result in seven invoices lining up to five receipts of goods. There may be one invoice and multiple receipt of goods (one truck with 100 widgets, dropped off at three locations). All the pieces of the transaction are included (a match, with a chargeback, the strategy used, the type of match, credit memo, if the process was disputed, what was the repayment, etc . . . ). The fourth quadrant of the screen (bottom left) may be reserved for the electronic submission of chargeback.

Thus this screen shows any subsequent action related to the specific match (payments, repayments, deductions, calls, chats,). This preserves the history so that if there is a post-audit, the settlement is documented. This screen also shows that screen, in one embodiment, may be divided into a first portion 320, a second portion 322, and a third portion 324. The line items in portion 322 may align in a side-by-side manner so that corresponding items in portion 324 may be more easily compared. A horizontal alignment facilitate comparisons for the human user. In some embodiments, it is sufficient that the portions 322 and 324 are in a side-by-side horizontal configuration on the same screen.

Figure 15B:
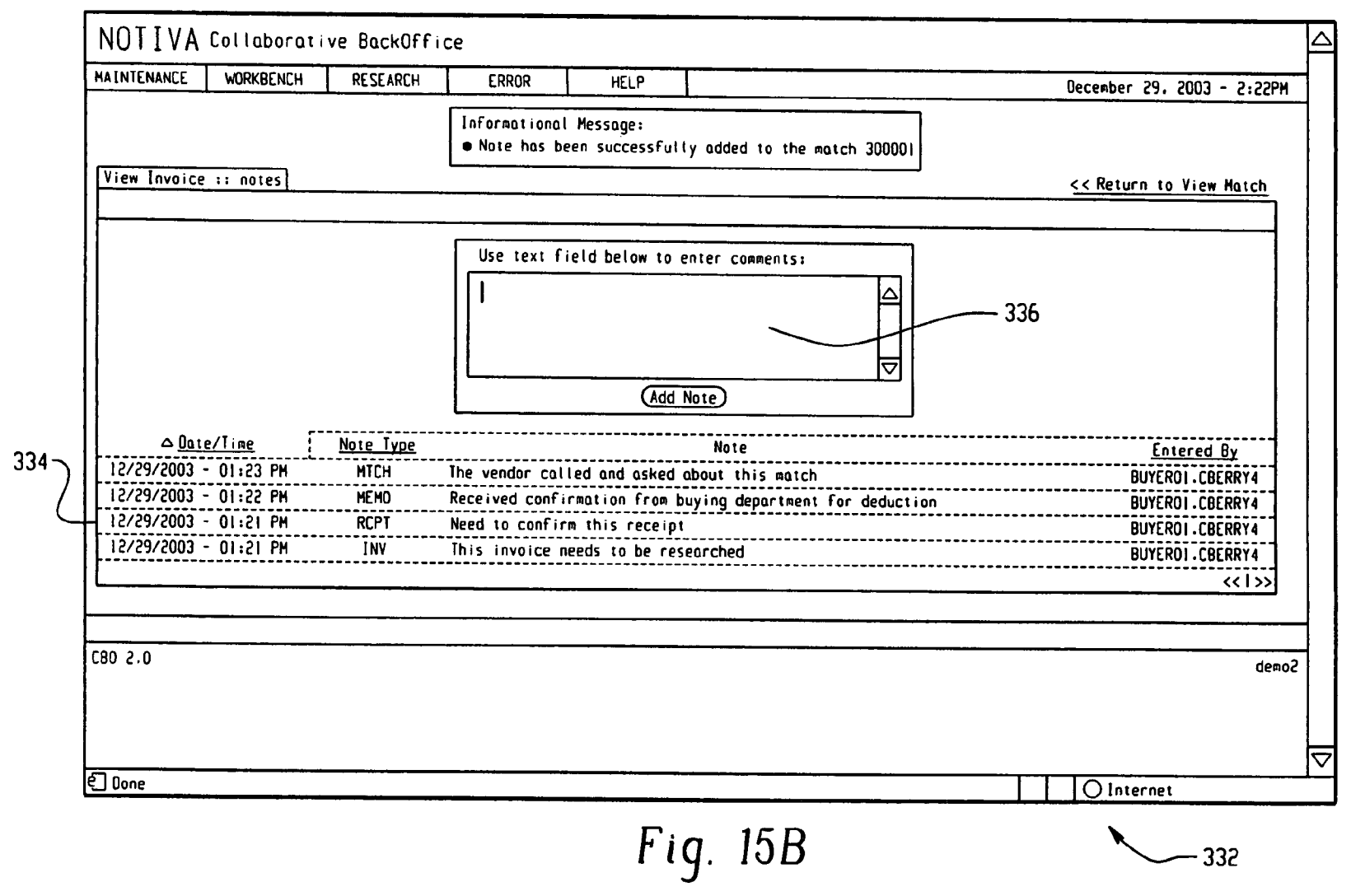

FIG. 15B is a view match notes screen interface 332 operable by a user of the system in order to identify and view notes associated with a particular match. This screen shows a list of notes 334 associated with a particular match. In addition to the text of the note, the date and time of the note creation are displayed, along with an indication of the type of note and who entered it into the system. From here the user can also add a note 336.

Figure 16:
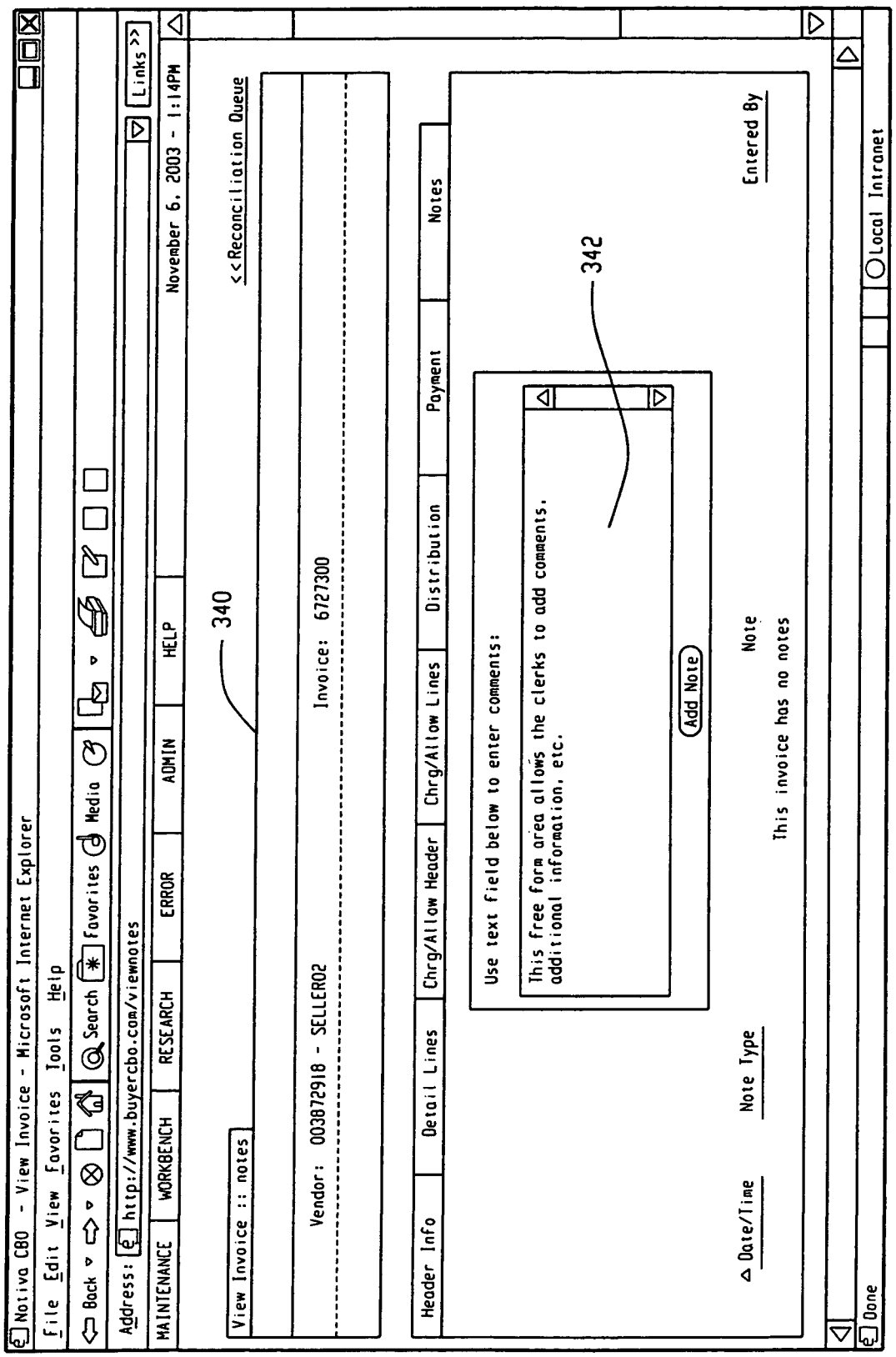
FIG. 16 is a notes interface screen operable by a user of the system in order to apply a textual note to a particular transaction document.

FIG. 16 is a notes interface screen 272 operable by a user of the system in order to apply a textual note to a particular transaction document. In this screen 272, a user has opened a notes window 342 and is applying a text note to a particular invoice. This note will be associated with the invoice and will be stored with it for future transactions. The system has the ability to add these types of notes to any of the transaction documents processed by the system. The notes can be marked such that only the buyer of seller can access the note, or it can be marked collaborative, in which case both the buyer and seller can access the note.

Figure 17:
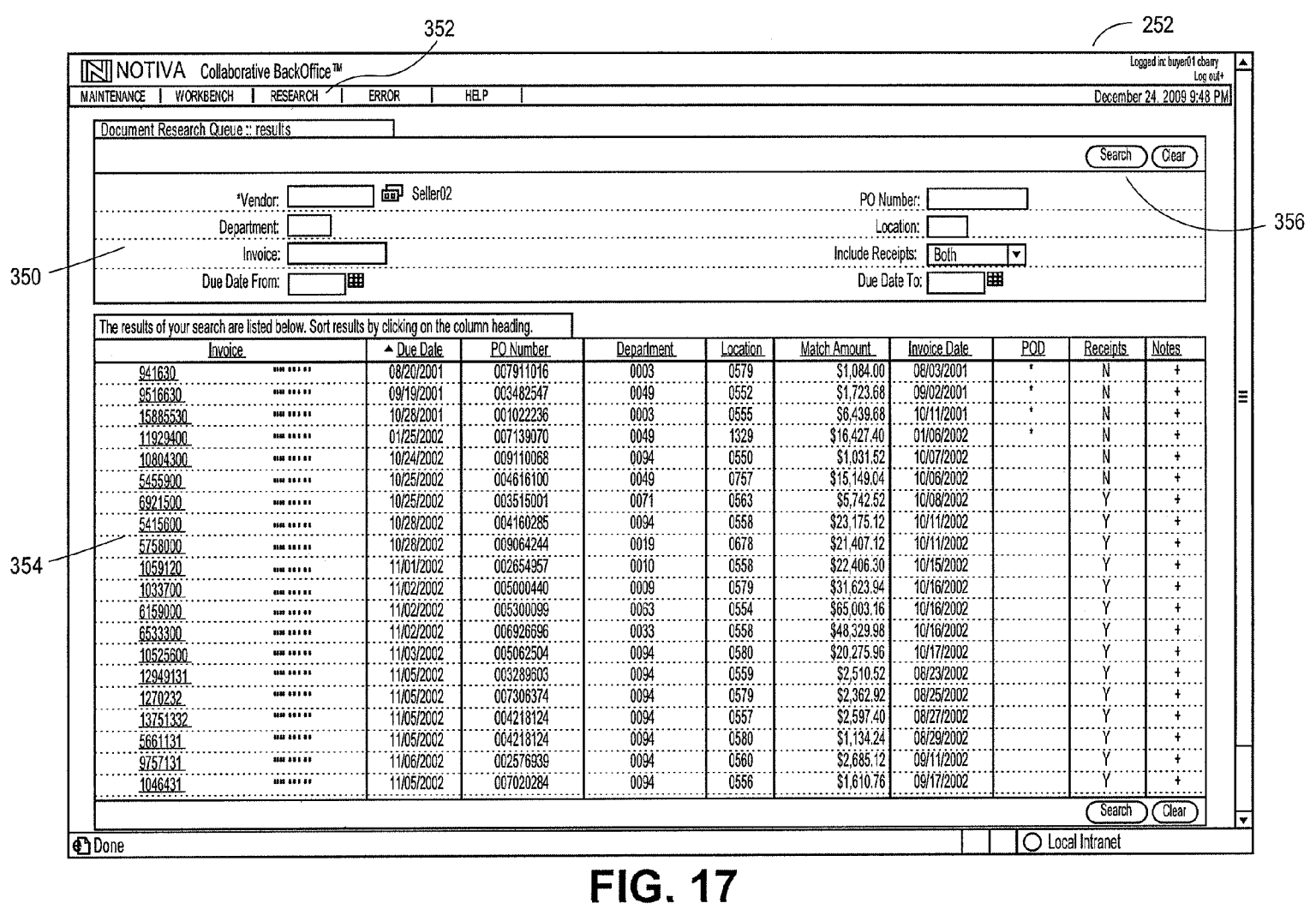

FIG. 17 is a reconciliation queue interface screen 252 operable by a user of the system in order to begin the manual reconciliation process described in FIG. 13. This interface includes a search box 350, in which the user can search for a particular invoice by vender, department, invoice number due date, PO number location, etc. The results of a particular search are displayed in the results window 354, which displays invoices due dates, PO numbers, department, location, match amount, invoice date, etc. From here, the user can select certain invoices for manual reconciliation as described above with reference to FIG. 13.

Figure 18:
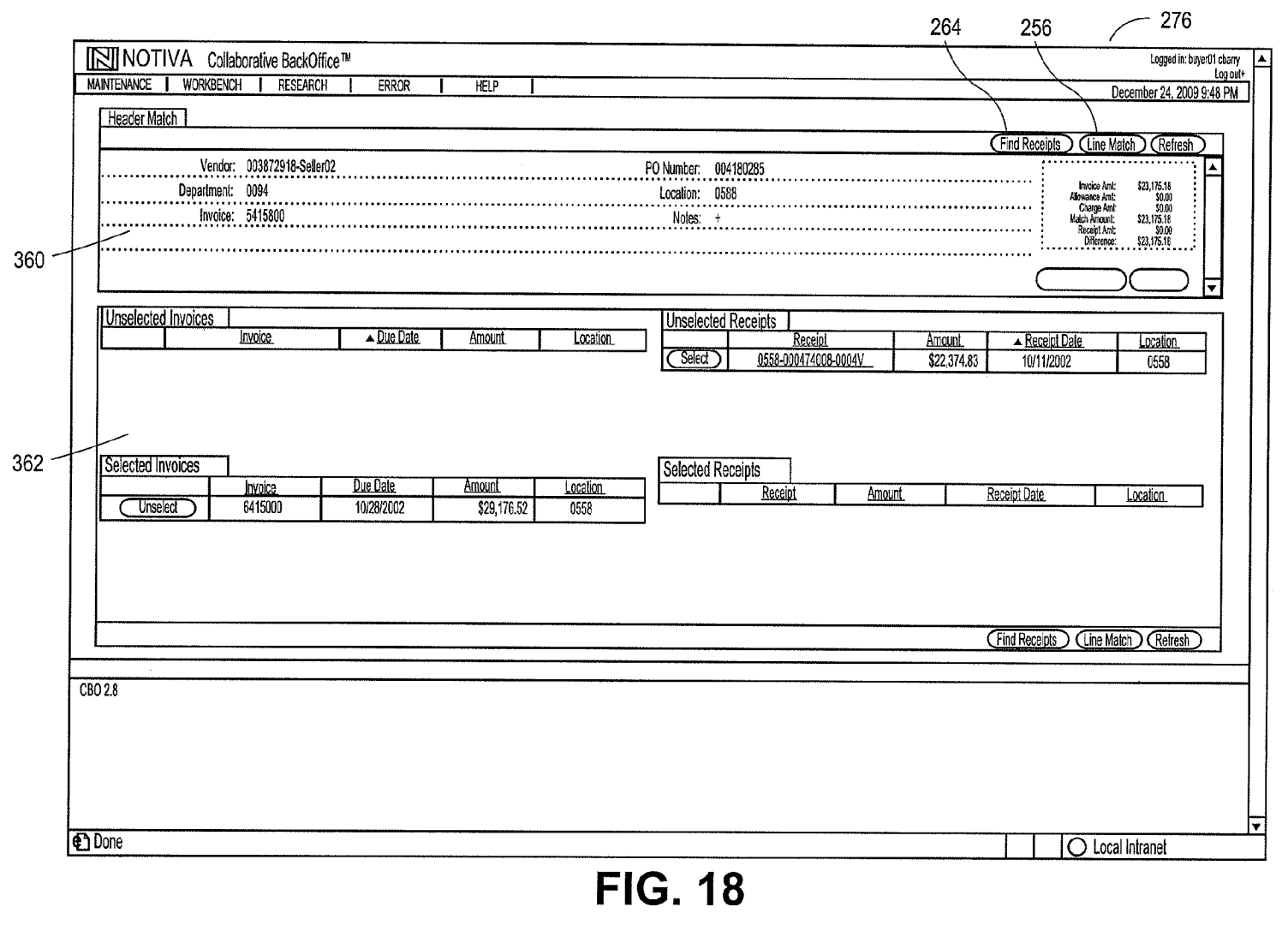

FIG. 18 is a header match screen interface 276 operable by a user of the system in order to manually reconcile invoices and receipts at the header level. The header match screen 276 includes a match box 360 and a selection box 362. The match box displays a selected invoice by vender, department, PO number etc., and also provides additional financial details regarding the invoice, such as invoice amount, match amount, difference amount, etc. From the selection box 362, the user can select certain receipts to apply to the selected invoice. In addition, the user can execute the find receipts function 264 if an appropriate receipt is not displayed in the match box 362, or the user can jump to the line match screen 256 to attempt to match the invoice at the line level.

Figure 19:
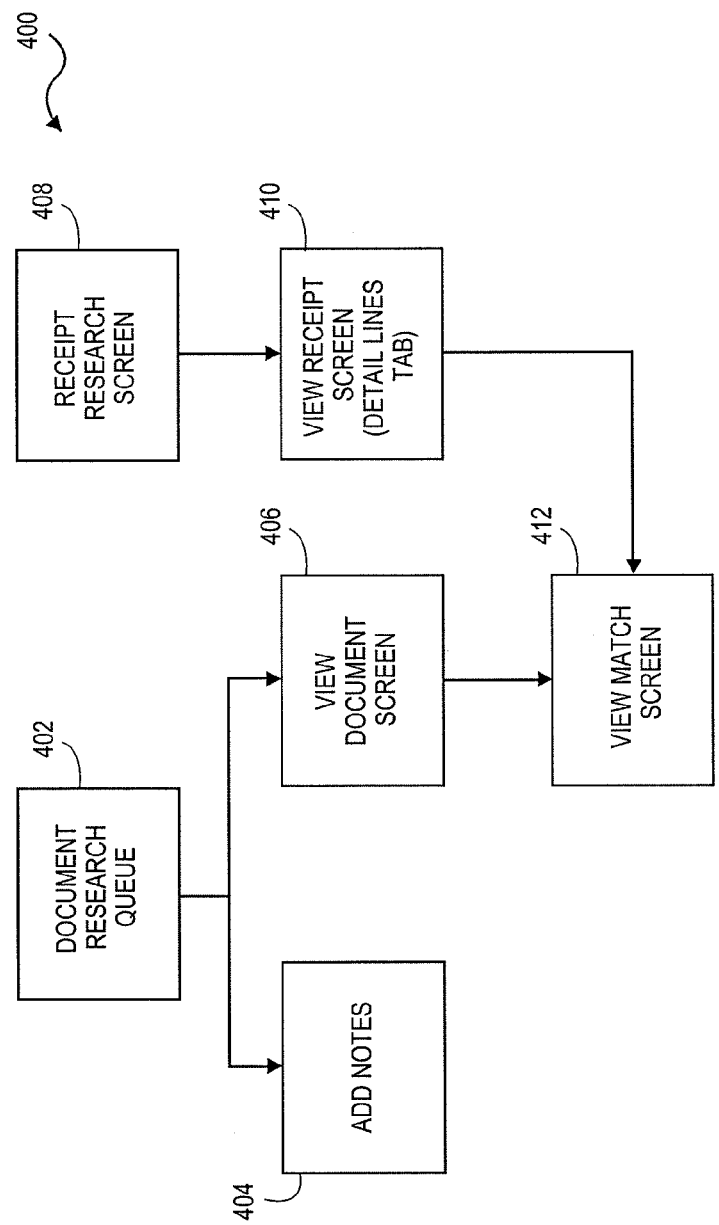
FIG. 19 is an exemplary process flow diagram for researching a particular match and viewing the match using the view match screen interface.

FIG. 19 is an exemplary process flow diagram 400 for researching a particular match and viewing the match using the view match screen interface. The process begins from the document research queue 402, which is accessible from many of the previously discussed system interface screens. From the research queue, the user can either add notes 404 or go to the view document screen 406. From the view document screen 406, the user can then go to the view match screen 412, as shown above in FIG. 15A and also shown below in FIG. 22. Alternatively, the user can begin at the receipt research screen 408, go to the view receipt screen 410, and then from there go to the view match screen 412. Alternatively ways of jumping to the view match screen are also possible.

Figure 20:
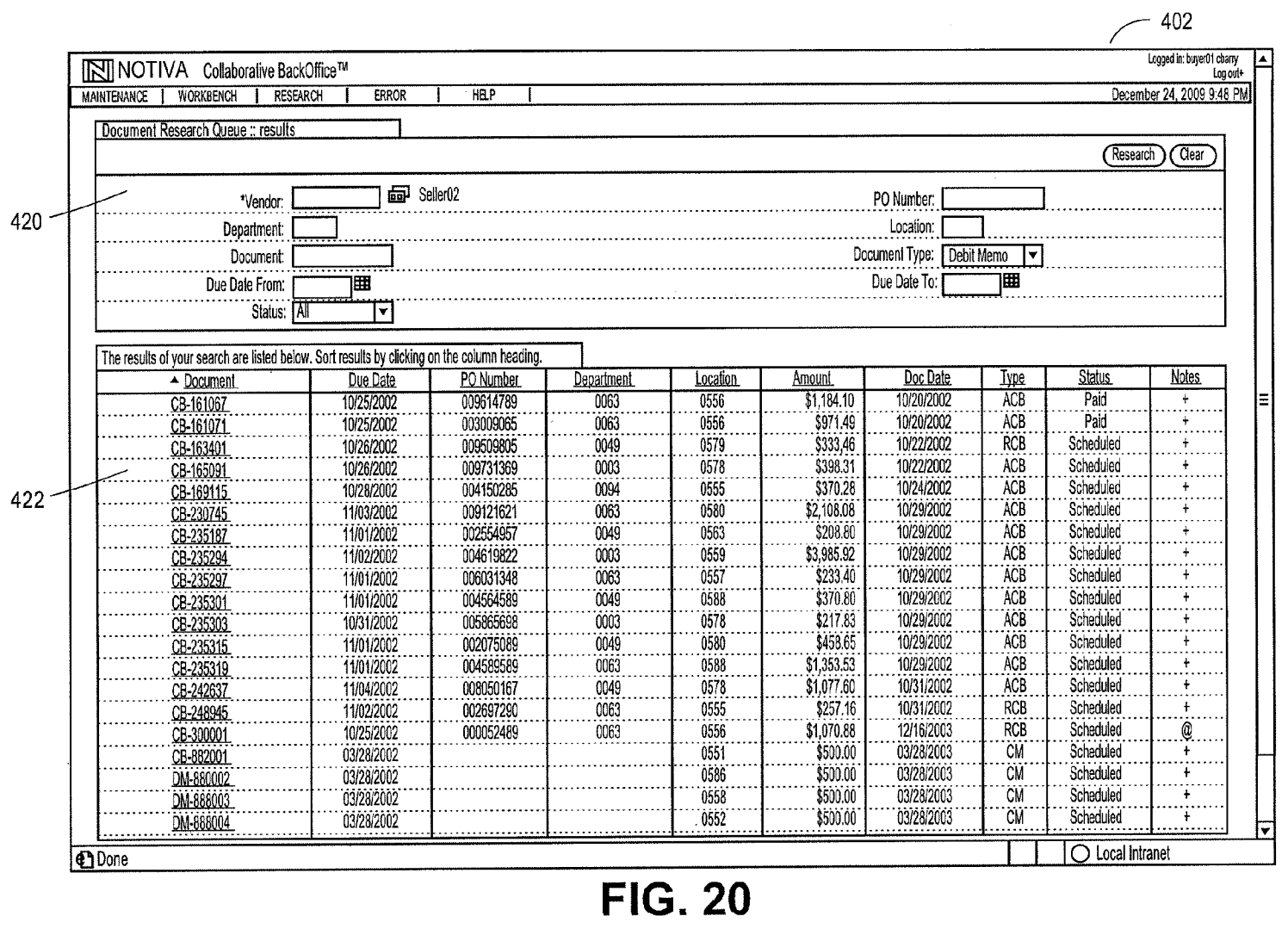

FIG. 20 is a document research queue interface screen 402. This screen includes a search box 420 and a search box 422. Similar to the reconciliation queue interface screen, from the document research queue, a user can enter certain search criteria and find relevant documents, which are displayed in the search results box 422. From here the user can then select a particular document, which results in the view document interface screen shown in FIG. 21.

Figure 21:
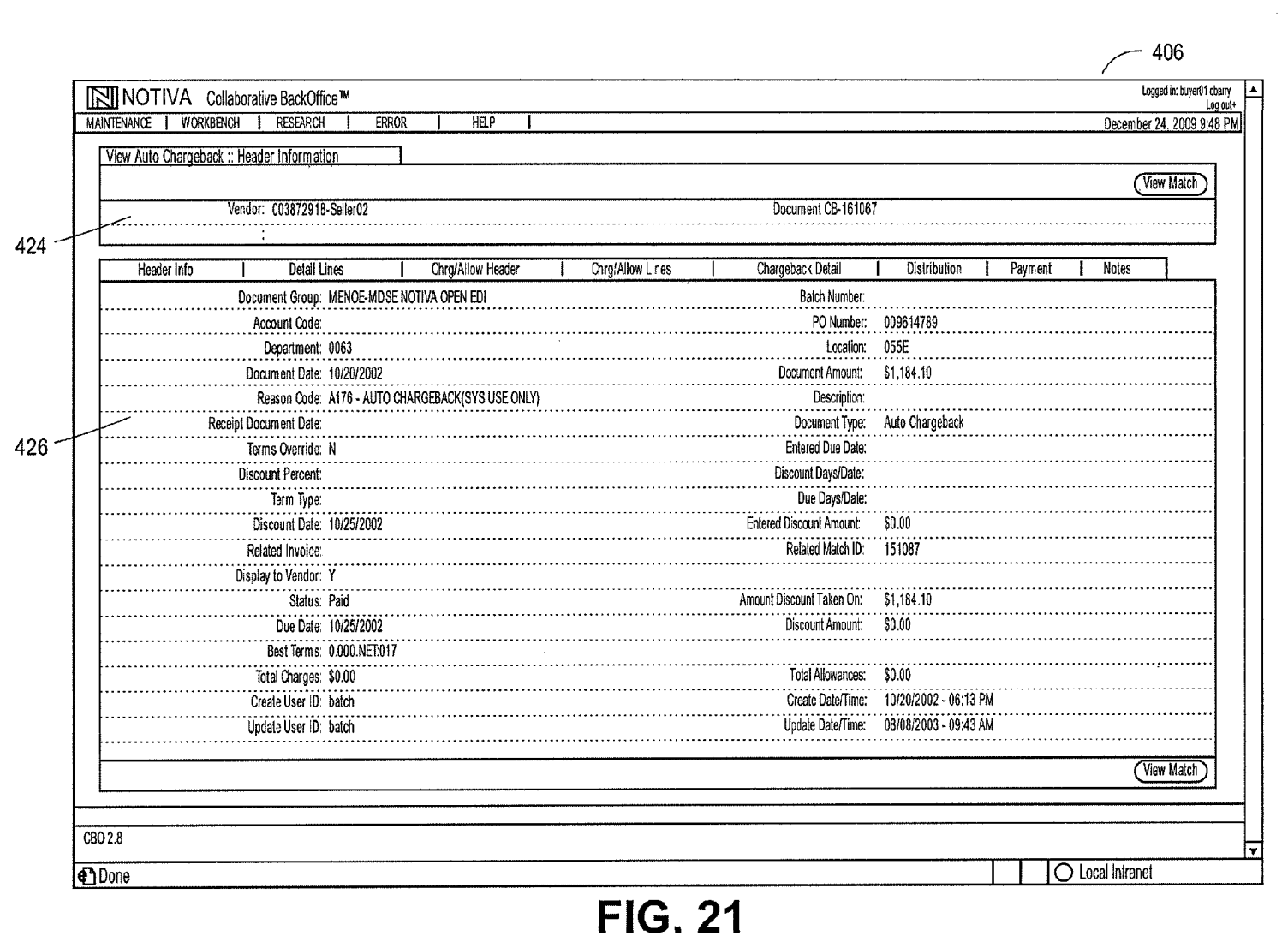

FIG. 21 is a view document screen interface 406. This interface provides numerous details regarding a selected document 426. From this screen the user can select the view match button in order to display the view match screen details for the selected document.

Figure 22:
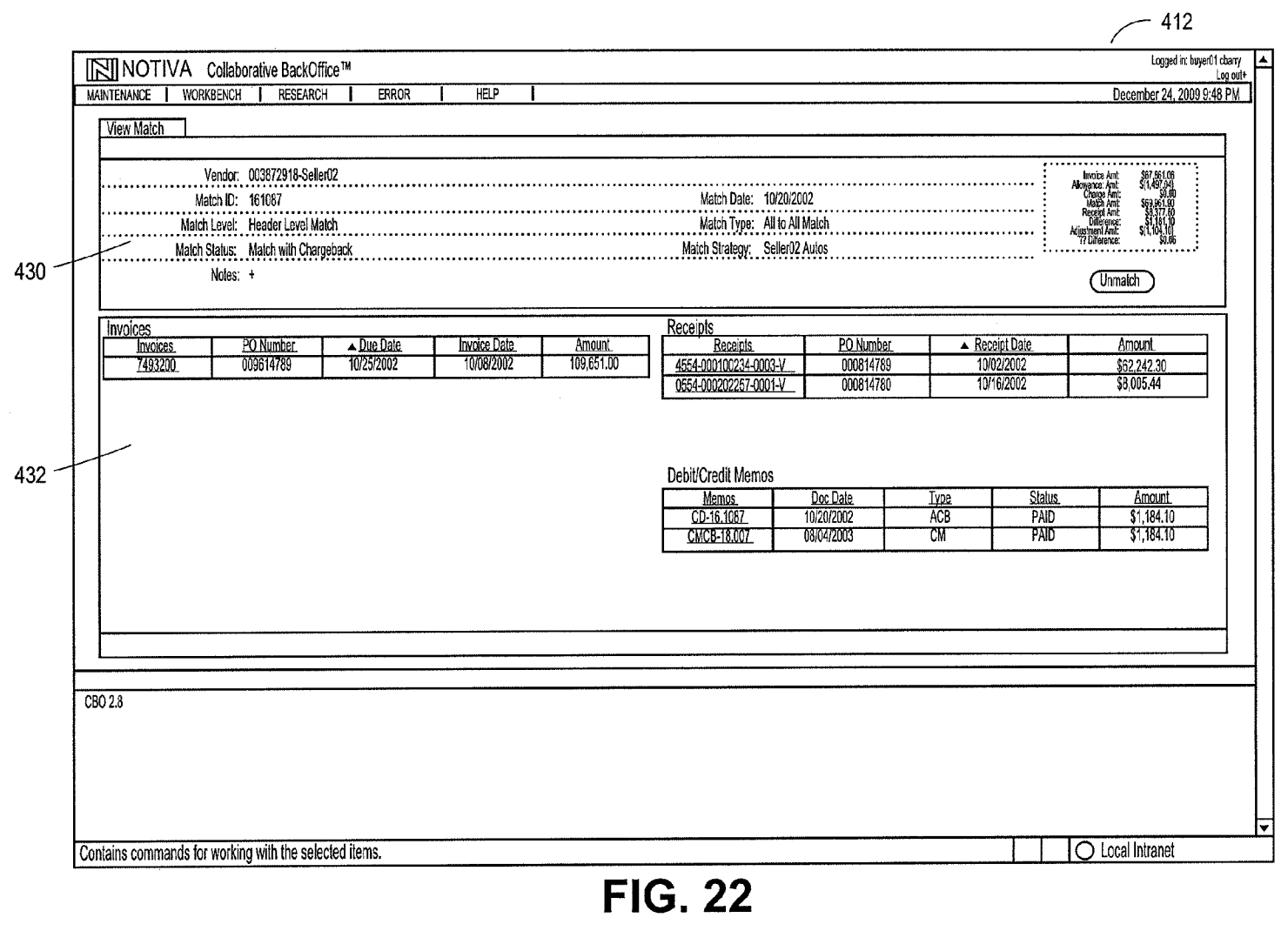

FIG. 22 is another example view match screen interface as described above with reference to FIG. 15A.

Figure 23:
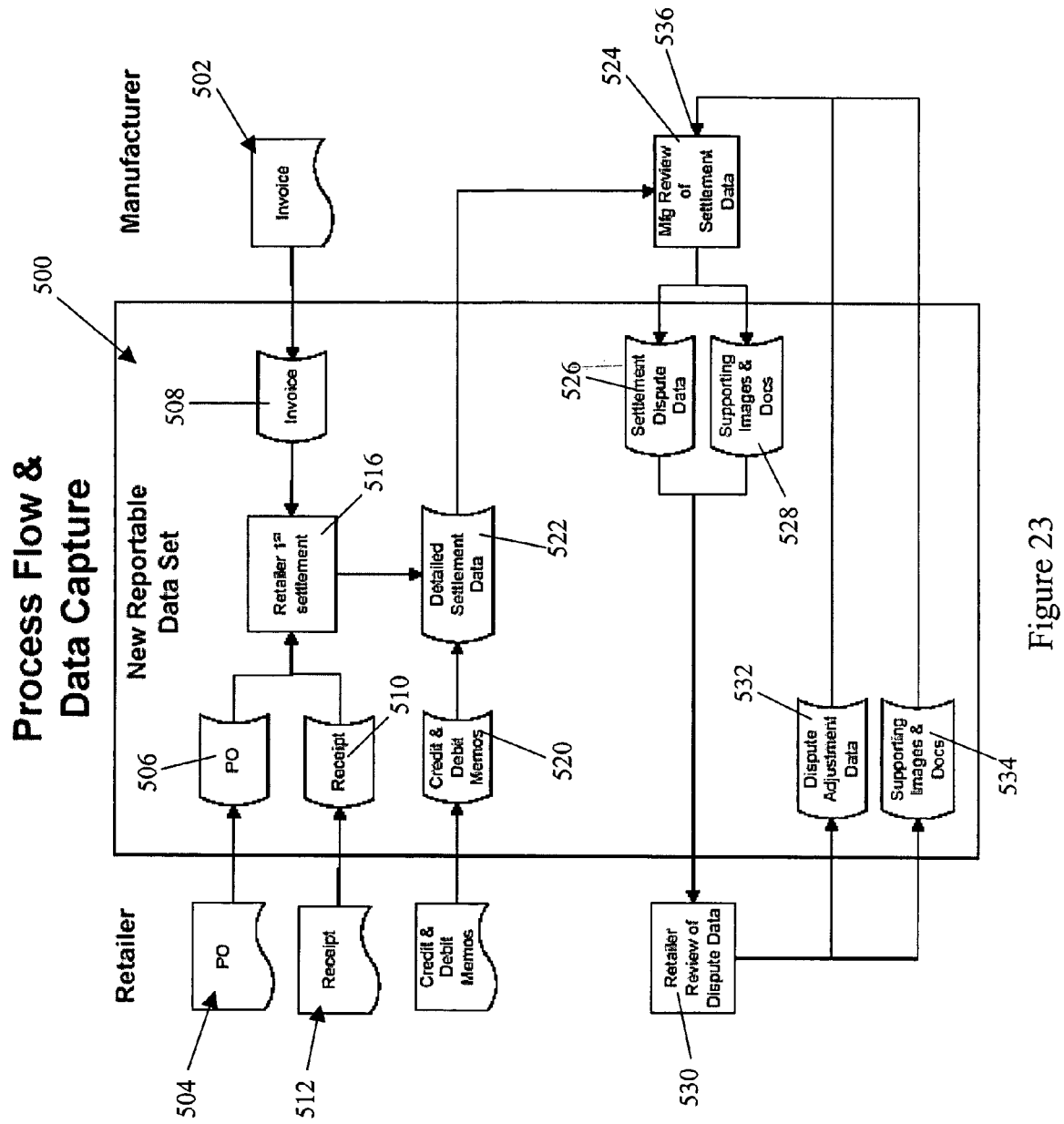
FIG. 23 is a block diagram showing the creation of an new data set according to the present invention.

Referring now to FIG. 23, another aspect of the present invention will now be described. FIG. 23 shows that in one embodiment, a symbiotic accumulative process to handle trade settlement which results in the creation of a new collaborative data set.

In one embodiment, the system according to the present invention is designed for access by both parties to view, reconcile, adjudicate and report on all financial transactions between the trading partners. All documents, memos, images, files, notes and correspondence related to the financial settlement of a transaction are captured and linked together in the system. This is for not only the original payment decision and/or deduction but also all dispute requests, supporting documentation and subsequent credits & debits until both parties are satisfied with the final settlement or recognize that any additional efforts will not affect the outcome. This information as it is brought into the system is then shared between both parties for a single source of data for the transaction. The creation and use of this data not only enables both the buyer and seller to more quickly settle transactions and reduce problems that may typically be caught in a post audit but also allows for transaction insight into the other trading parties business process, efficiencies, limitations, successes, etc thus creating a more accurate view of both parties efforts in the financial and physical supply chain. Both parties involved will work on one piece of data together, versus different data sources being worked on separately. Any changes to any documents or any subsequent credit or debit memos to that process are then saved in a collaborative data set.

FIG. 23 shows that a new data set 500 is created based settlement of at least one invoice 502 and at least one purchase order 504 for a particular transaction. By way of example and not limitation, the data set 500 may be stored at a central datastore (which may be part of the platform 15) that is accessible to users from the buying company (retailer) or the selling company (manufacturer). In the present embodiment, a single platform 15 is used to match invoices and purchase orders and then handle and settlement issues. Because in one embodiment, only a single platform 15 is used to process all transactions, those transactions can be captured to form the data set 500 related to at least one particular transaction (whether based off of at least one invoice, at least one purchase order, or at least one receipt of goods). The data set 500 may contain purchaser order detail information 506 and invoice detail information 508 obtained in this example from the retailer and manufacturer respectively. The receipt of goods information 510 may also stored into the data set 500 from the retailer's receipt of goods 512. This information may then be used to match invoices with purchase orders/receipt of goods using methods as described herein. This may result in a retailer first settlement 516 of the transaction.

FIG. 23 further shows that embodiments of the present invention further includes additional settlement information that is useful to obtain an accurate history of the settlement transactions. As seen in FIG. 23, credit and/or debit memos 520 may also be incorporated into the data set 500. This may be included as part of the detailed settlement data 522. In the present example, the manufacturer may then review settlement data at step 524. If the manufacturer determines that the settlement was inaccurate, they may then enter settlement dispute data 526 into the data set 500. Supporting documentation may also be captured and scanned images 528 incorporated as part of the data set 500. As mentioned, the retailer will have access to this same data set 500 and can see the additional settlement data added by the manufacturer. This allows the retailer to leverage on the work done by the manufacturer and examine if the settlement was accurate. The retailer will review the disputed data at step 530. The retailer may then include their own settlement dispute data 532 and images of documentation 534 into the data set 500. The retailer may send images of pricing list, proof of Co-op advertising, etc. . . . .

This process of review may be iterative and as indicated by arrow 536, the process will continue until a final settlement satisfactory to both parties is reached. The present invention allows for multiple iterations of the resolution process (go back and forth) and all of this is captured by the data set 500. This is entered by the user. Each user is doing work, but the other may benefit off of it. The data and documents are captured and stored in same location. This is something they would probably do any way, but it is being captured and stored and added to this data set since in the present embodiment, transactions pass through the processing engine. Thus, all subsequent settlement transactions and supporting documentation are captured by the data set 500 so that a complete, cumulative trade settlement is documented. Embodiment of the present invention may create a collaborative data set in the central datastore based in part on the matched record and any subsequent settlement history. In one embodiment, the capturing of post-match, settlement history may involve storing all additional settlement data to be used to as part of the same collaborative data set 500 in the central datastore of the single platform 15, wherein at least one of the following is stored: credit memos, debit memos regarding the invoice and/or the purchase order of the matched record, settlement dispute data from the selling company, supporting images and documentation from the selling company, settlement dispute data from the buying company, supporting images and documentation from the buying company. Users from the buying company and users from the selling company accessing the collaborative data set 500 to reconcile the transaction using the matched record settlement transaction history and supporting documentation stored in the datastore.

By creating a data set 500, all parties use this data set that previously did not exist. Instead of individual datasets at each party's local computer and not being worked on by both parties, all of this information is stored at one dataset accessible to both parties. The present invention allows things to be stored that could not be stored before (and additional detail is kept). Together they build this datastore. This is the archival, ongoing settlement, communication, post audit, etc. . . . (the aftermath). The present invention provides both parties with information and access they do not normally have and this is unique to the present invention. This may include information from manufacturer that the retailer may not normally have in an electronically format. They cannot leverage each other's work when both parties are not working off of the same data set. Since all parties must work through a single transaction platform that creates a data set for each transaction, the settlement history is more easily tracked.

By way of example and not limitation, one party can see how the other resolves say a price issue. Not part of any old data, this may be a new price set based on knowledge they have gained as part of settlement iterative review by seller and buyer. For example, a bill of lading into the system may not have been tied back to the original transaction. In a post audit, the dots are now connected. The present invention provides a true report card of why there was success and how the user succeeded.

It should be understood that on the retailer side, there are two separate processes. There is payment side and there is the procurement side (and the two are kept separate). Procurement side may write a purchase order. The delivery may have multiple purchase orders on it, but the same goods on those multiple purchase orders. Might be 10 10 and 10. First purchase order may get 10, but he receives 30. Other two deliveries may not get the goods since all thirty were delivered at the first stop. So, those two purchase orders are short. This highlights that how goods are ordered and how goods are delivered can occur in very different ways. In the present invention, the same workspace is used. A communal workspace allows for more accurate matching and it allows for one'side to connect the invoices and receipt of goods that make sense. The manufacturer may be allowed to change the matching of invoices and receipt of goods during the iterative review. The present example allows a user from the manufacturer to match the invoices to show that a total of 30 units were received by retailer (even though all thirty were delivered to one location instead of three). This rematching will then indicate the receipt of goods does match the invoice. The total delivered matches the total to be paid. Not much is done in the art beyond an initial match. The present invention archives the corrections, and this is not being tracked today.

Figure 24:
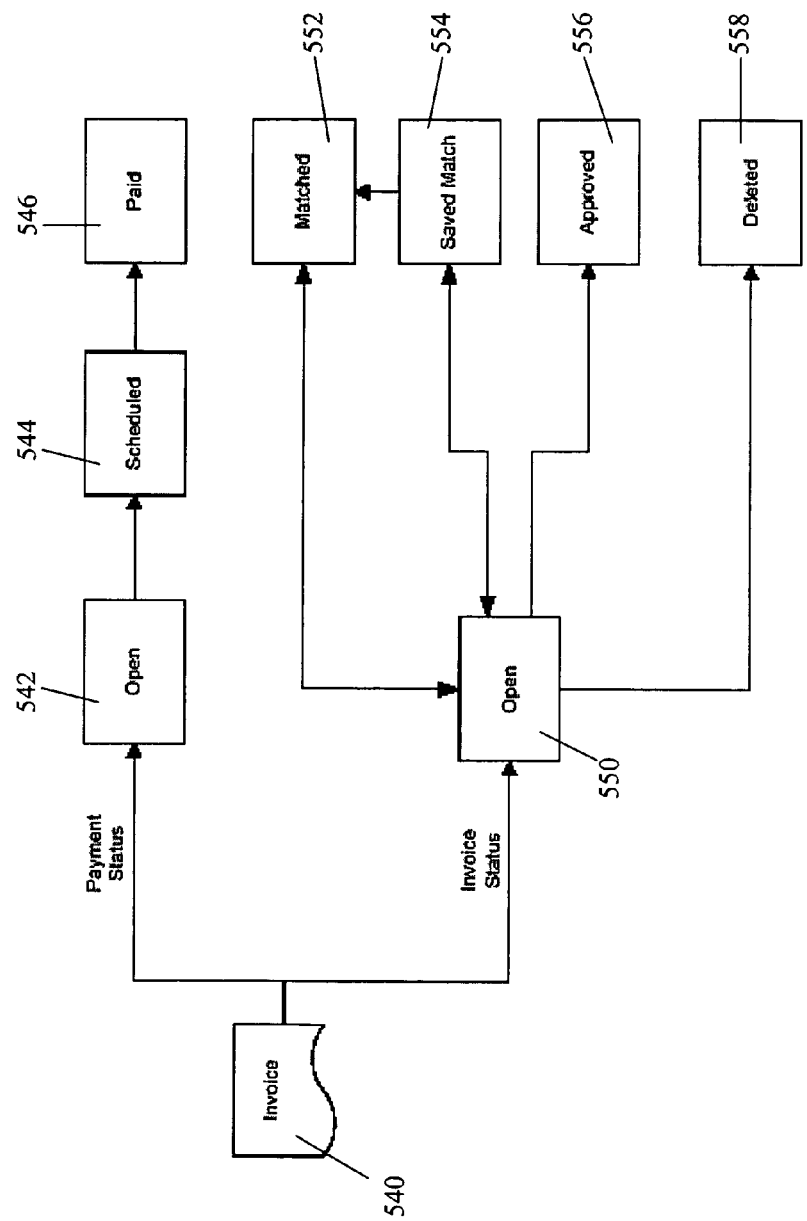
FIG. 24 is a block diagram showing the invoice statuses.

Referring now to FIG. 24, yet another aspect of the present invention will now be described. Pre & post payment deduction management is shown in the figure.

In the present embodiment, the system manages multiple non-dependent statuses for an invoice. This allows an invoice 540 to be paid before it is verified against a receipt and then have a deduction applied to it when it finally is matched. This enables buyers the ability to take terms discounts even when their internal process for invoice approval can not be accomplished in the terms discount time frame. FIG. 24 shows that payment status and invoice status may be decoupled. Under the payment status, the invoice may move from being open at step 542, to being scheduled at step 544, and to being paid at step 546.

As seen in FIG. 24, however, this payment status may be independent of the invoice match status. This allows an invoice 540 to be paid before it is verified against a receipt and then have a deduction applied to it when it finally is matched. Under invoice match status, the invoice may move from open status 550 to a matched status 552. The invoice may be moved to a saved match status 554. Saved match is when a retail user is using the on-line reconciliation screens and has found an invoice and a receipt that look like they go together, but still hasn't verified all of the invoice and needs to either verify it with another department, person, etc they can save the point in the match where they are so as to not lose their work. Alternatively, the status may be an approved status 556 or a deleted status 558.

Figure 25:
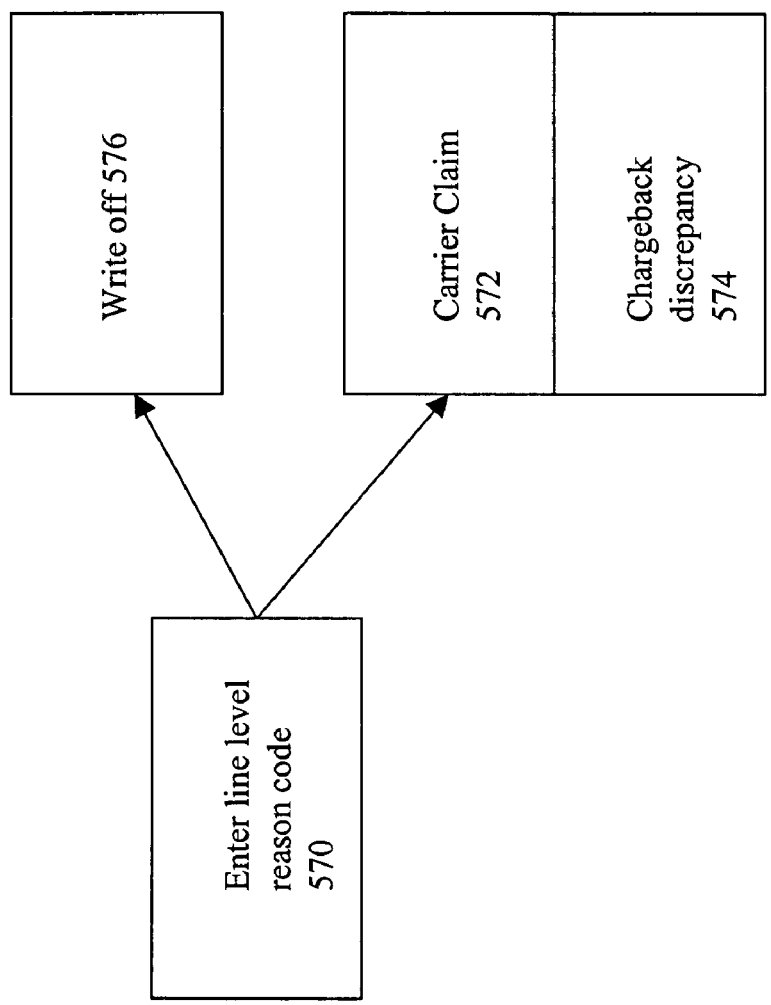
FIG. 25 is a block diagram showing the line level coding and handling of discrepancies and claims.

Referring now to FIG. 25, it should also be understood that the embodiments of the present invention may have Carrier Claims generated out of the line match reconciliation process. By using Line Level Reason Codes 570, users can classify line item quantity discrepancies as a carrier claim 572, chargeback 574, or write-off 576. This functionality includes the ability to split an individual item discrepancy into both a Carrier Claim and Chargeback discrepancy. As the user is assigning the discrepancies, running totals are being kept at the top of the screen to provide a full picture of the classification process. Once the classification process is complete, the user can perform the match and the related chargeback and/or carrier claim will be systematically generated. Both documents are tied to the original match to provide a complete audit trail of the invoice deduction. This all in one process reduces the need for the user to have to go back post match creation and enter the necessary adjustment documents to account for the carrier claim. In addition, the current manual process of sending the Carrier Claim packet to the logistics or transportation area can be accomplished through a systematic feed through the current extract process.

Post Carrier Claim processing is also provided with allows for the Account Rep to reverse a Carrier Claim and have the flexibility to generate a debit memo to the merchandise vendor if necessary. Once again, all documents are tied to the original match to provide a full audit trail of the payment lifecycle.

It should be understood that embodiments of the present invention may also allow for add on charge and allowance matching.

Figure 26:
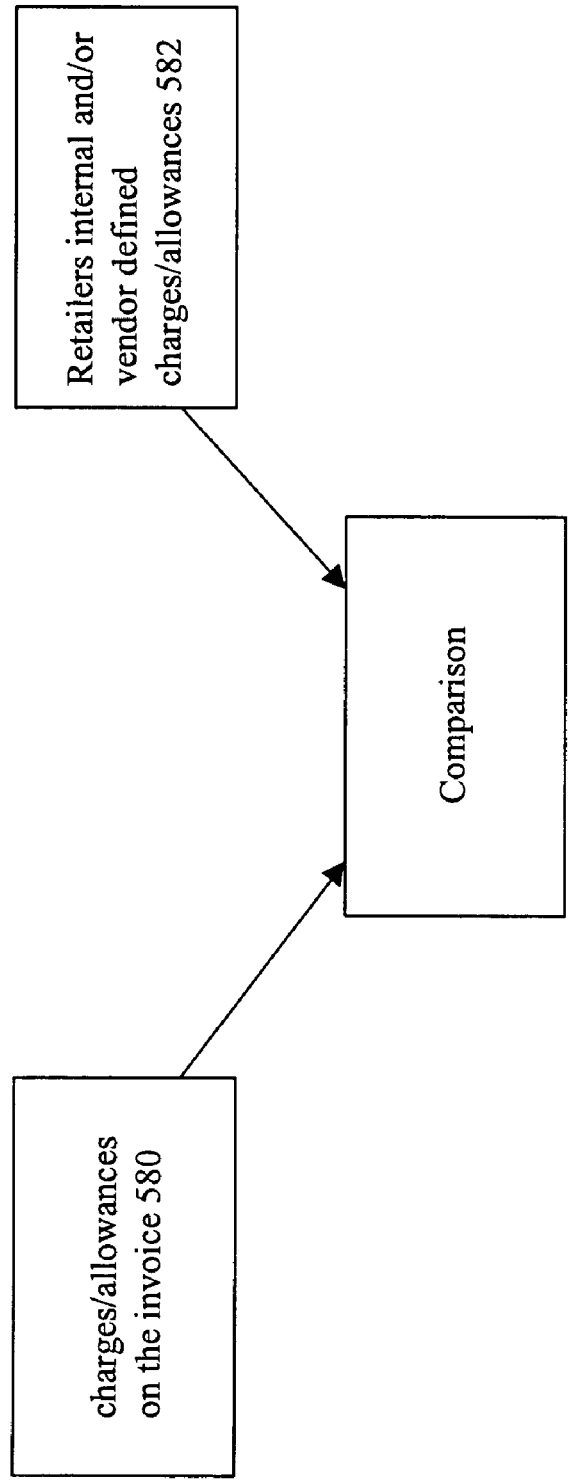
FIG. 26 is a block diagram showing the comparison of charges and allowances according to the present invention.

Referring now to FIG. 26, at the time of an invoice match or invoice approval, the system compares the charges/allowances 580 on the invoice to the Retailers internal and/or vendor defined charges/allowances 582. Vendor header level charges/allowance amounts or percents can be defined through the flexible Admin screens according to the present invention. For discrepancies that are not in the retailers favor, a charge/allowance chargeback is generated back to the merchandise vendor. The charge/allowance comparison is performed at both the header and line level. Charge/allowance chargebacks are tied to the match to provide a full audit trail of the invoice deduction. In addition, embodiments of the present invention provides visibility of all charge/allowance's involved in the match and clearly identifies which is the "best" charge/allowance that was taken by the Retailer.

Performing the charge/allowance match prior to payment of the invoice can reduce post audit findings. The retailer can reduce the amount of the vendor payment based on what they consider to be the best allowance. If the charge/allowance match was not performed, the retailer would have to go back for the allowance discrepancy post payment.

It should be understood that embodiments of the present invention may also take allowance based on Goods Received. Based on the individual Retailer's business practice, the taking of allowances is not always solely based on the invoice amount. For certain Retailers, the business practice is to only take allowances on the actual goods received. The application of the present invention is flexible enough to handle both scenarios. For allowances that are quantity based, the Retailer can choose to apply the "best" allowance to the merchandise chargeback to reduce the amount of the deduction. Example: If the retailer only receives 80% of the goods, the retailer can apply 20% of the "best" allowance to the merchandise chargeback.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. It is to be understood that some operations could be carried out with different elements and steps. These embodiments described herein are presented only by way of example and are not meant to limit the scope of the present invention. For example, with any of the above embodiments, component pricing: (price per unit, price for shipping . . . keeping all the individual things separate, instead of just one price) may be introduced to provide more granularity on the price per unit. With any of the above embodiments, every action on every transaction may be tracked so that a complete history is captured. For any of the above embodiments, the present invention may allow for tying deductions back to original transaction (it is a different classification of documents). For any of the above embodiment, score cards and analytics may be based on the new data set 500. Metrics may be performed on the new data set.

For any of the embodiments herein, by way of example and not limitation, the application of the present invention for settlement transactions may be implemented within a framework of an Application Service Provider (ASP) system embedded in a central server computer platform having a network interface. Server platform can be a single workstation computer such as a PC, a mainframe computer or a collection of computers interconnected by a local or wide area network. Server platform is capable of handling web-enabled technologies by means of web server application such as BEA WebLogic Server which supports Hypertext Transfer Protocol (HTTP). Such technologies include for example Java applets, JavaScripts, HTML, DHTML, XML, and the like on the client side, and Servlets, Java Pages (JSP) and Enterprise Java Beans (EJB) and the like on the server side. A user of the system communicatively interfaces over a data communication network, such as the Internet or Intranet, to central server by conventional communication devices such as a modem, a network card and the like, using a software application, i.e., Web Browser (e.g., Microsoft Explorer, Netscape Navigator).

This application is related to co-pending U.S. application Ser. No. 09/777,168 filed February 2001 (issued Apr. 19, 2005 as U.S. Pat. No. 6,882,983) and U.S. Provisional Application Ser. No. 60/533,816 filed Dec. 30, 2003. The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A method of processing transactions between at least one buying company and at least one selling company which results in creation of a new collaborative data set, the method comprising:
providing a central datastore accessible to a user from at least one buying company and a user from at least one selling company;
obtaining, via a computer network, purchase order data having at least one entry, the purchase order data including purchase order header information and purchase order detail information;
obtaining, via a computer network, invoice data having at least one entry, the invoice data including invoice header information and invoice detail information;
sorting the purchase order data corresponding to one or more purchase orders into a plurality of hierarchical logical groups using one or more user-defined parameters, each logical group having a subset of purchase order data;
sorting the invoice data corresponding to one or more invoices into the plurality of hierarchical logical groups using one or more user-defined parameters, each logical group having a subset of invoice data;
determining, via a computer, a matched record having corresponding purchase order data and invoice data based in part on the sorted purchase order data and the sorted invoice data using the plurality of hierarchical logical groups and a plurality of matching rules;
identifying a set of purchase orders corresponding to the determined purchase order data of the matched record;
identifying a set of invoices corresponding to the determined matched record invoice data;
creating a collaborative data set in the central datastore based in part on the matched record and storing detailed settlement data in the datastore regarding settlement of the matched record of purchase order data and corresponding invoice data;
providing for storage of additional settlement data in the central datastore, wherein credit memos and debit memos regarding one of the invoice and the purchase order of the matched record are stored as part of the collaborative data set;
receiving into the datastore an indication of a dispute regarding the purchase order data and the corresponding invoice data;
storing as part of the collaborative data set supporting images and documentation related to the dispute from one of the at least one buying company and at least one selling company, wherein the supporting images and documentation are accessible to the users from both the at least one buying company and the at least one selling company; and
reconciling in the datastore the transaction using the matched record.

2. The method of claim 1 wherein:
the transaction is reconciled using only data and documents captured and stored in the datastore as part of the collaborative data set.

3. The method of claim 1 wherein:
documents, memos, images, files, notes, and correspondence related to the financial settlement of a transaction are captured and linked together in the datastore.

4. The method of claim 1 wherein:
the datastore includes an original payment decision, original payment deduction, dispute requests, supporting documentation, and subsequent credits and debits entered until both at least one buying company and at least one selling company are satisfied with the final settlement.

5. The method of claim 1 wherein:
information brought into the datastore is then shared between both at least one buying company and at least one selling company for a single source of data for the transaction.

6. The method of claim 1, further comprising allowing the at least one buying company and the at least one selling company access to selected data in the datastore by providing a web page accessible by the at least one buying company and a web page accessible by the at least one selling company via a global computer network.

7. The method of claim 1, wherein the purchase order header information comprises a purchase order number, a client identification, a vendor identification, and a purchase order date.

8. The method of claim 7, wherein the purchase order detail information comprises the purchase order header information, a quantity ordered for each purchase order entry, an item identification for each purchase order entry, a unit price for each purchase order entry, and a charge code for each purchase order entry.

9. The method of claim 1, wherein the invoice header information comprises an invoice number, a client identification, a vendor identification, and an invoice date.

10. The method of claim 9, wherein the invoice detail information comprises the invoice header information; a quantity shipped for each invoice entry; an item identification for each invoice entry; and an extended price for each invoice entry.

11. The method of claim 1, wherein the obtaining purchase order data comprises obtaining the purchase order data in electronic format.

12. The method of claim 11, wherein the obtaining purchase order data further comprises obtaining the purchase order data via a global computer network.

13. The method of claim 1, wherein the obtaining invoice data comprises obtaining the invoice data in electronic format.

14. The method of claim 13, wherein the obtaining invoice data further comprises obtaining the invoice data via a global computer network.

15. The method of claim 1, wherein the obtaining purchase order data comprises obtaining the purchase order data in paper format.

16. The method of claim 15, further comprising converting the purchase order data to electronic format.

17. The method of claim 1, wherein the obtaining invoice data comprises obtaining the invoice data in paper format.

18. The method of claim 17, further comprising converting the invoice data to electronic format.

19. The method of claim 18, wherein the obtaining invoice data is conducted by a party other than the buying company or the selling company.

20. The method of claim 1, wherein the determining the matched record is performed automatically using a computer.

21. The method of claim 1 wherein:
the transaction is reconciled using only data and documents captured and stored in the datastore as part of the collaborative data set.

22. The method of claim 1 further comprising:
users from the at least one buying company reviewing additional settlement data added by users from the at least one selling company;
users from the at least one selling company reviewing additional settlement data added by users from the at least one buying company; and
repeating the reviewing the additional settlement data added by users from the at least one buying company and users from the at least one selling company until a final settlement is reached.

23. The method of claim 1, wherein a single platform is provided for handling all transactions for trade settlement.

24. A method of processing transactions between at least one buying company and at least one selling company which results in creation of a new collaborative data set, the method comprising:
providing a central datastore accessible to a user from the at least one buying company and a user from the at least one selling company;
obtaining, via a computer network, purchase order data having at least one entry, the purchase order data including purchase order header information and purchase order detail information;
obtaining, via a computer network, invoice data having at least one entry, the invoice data including invoice header information and invoice detail information;
sorting the purchase order data corresponding to one or more purchase orders into a plurality of hierarchical logical groups using one or more user-defined parameters, each logical group having a subset of purchase order data;
sorting the invoice data corresponding to one or more invoices into the plurality of hierarchical logical groups using one or more user-defined parameters, each logical group having a subset of invoice data;
determining, via a computer, a matched record having corresponding purchase order data and invoice data based in part on the sorted purchase order data and the sorted invoice data using the plurality of hierarchical logical groups;
identifying a set of purchase orders corresponding to the determined purchase order data of the matched record;
identifying a set of invoices corresponding to the determined matched record invoice data;
creating a collaborative data set in the central datastore based in part on the matched record;
receiving into the datastore an indication of a dispute regarding the purchase order data and the corresponding invoice data;
storing as part of the collaborative data set supporting images and documentation related to the dispute from one of the at least one buying company and at least one selling company, wherein the supporting images and documentation are accessible to the users from both the at least one buying company and the at least one selling company; and
reconciling the transaction using the matched record.

25. The method of claim 1 further comprising:
determining the matched record using a set of user-defined matching rules.

26. The method of claim 1 wherein the matched record is determined using an iterative analysis of the plurality of hierarchical logical groups.

* * * * *

UNITED STATES PATENT AND TRADEMARK OFFICE
CERTIFICATE OF CORRECTION

PATENT NO. : 8,326,754 B2  Page 1 of 1
APPLICATION NO. : 11/028489
DATED : December 4, 2012
INVENTOR(S) : Bandych et al.

It is certified that error appears in the above-identified patent and that said Letters Patent is hereby corrected as shown below:

On the Title Page, Item (75), under "Inventors", line 5, delete "Inner" and insert -- Inver --, therefor.

In column 17, line 30, delete "174" and insert -- 194 --, therefor.

In column 19, line 59, delete "many-to many," and insert -- many-to-many, --, therefor.

In column 27, line 27, delete "one'side" and insert -- one side --, therefor.

In column 29, line 40, delete "February 2001" and insert -- February 5, 2001 --, therefor.

Signed and Sealed this
Twelfth Day of March, 2013

Teresa Stanek Rea
*Acting Director of the United States Patent and Trademark Office*